US010440041B2

(12) United States Patent
Zhou et al.

(10) Patent No.: US 10,440,041 B2
(45) Date of Patent: *Oct. 8, 2019

(54) SYSTEMS AND METHODS FOR SECURING ACCESS TO RESOURCES

(71) Applicant: VISA INTERNATIONAL SERVICE ASSOCIATION, San Francisco, CA (US)

(72) Inventors: Haochuan Zhou, Redwood City, CA (US); Hung-Tzaw Hu, Saratoga, CA (US); Rong Zhang, Fremont, CA (US); Benjamin Scott Boding, Mountain View, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,875

(22) Filed: Sep. 18, 2018

(65) Prior Publication Data

US 2019/0089726 A1   Mar. 21, 2019

Related U.S. Application Data

(63) Continuation of application No. 15/812,334, filed on Nov. 14, 2017, now Pat. No. 10,110,621, which is a
(Continued)

(51) Int. Cl.
*H04L 29/06* (2006.01)
*G06Q 20/32* (2012.01)
(Continued)

(52) U.S. Cl.
CPC ..... *H04L 63/1425* (2013.01); *G06Q 20/3224* (2013.01); *G06Q 20/389* (2013.01);
(Continued)

(58) Field of Classification Search
CPC ..... H04L 63/10; H04L 63/101; H04L 63/108; H04L 63/1425; H04L 63/20; H04L 63/205; G06F 2221/2141
See application file for complete search history.

(56) References Cited

U.S. PATENT DOCUMENTS

2009/0292568 A1   11/2009   Khosravani et al.
2009/0319452 A1   12/2009   Gardner et al.
(Continued)

FOREIGN PATENT DOCUMENTS

WO   2015048418   4/2015

OTHER PUBLICATIONS

Martin et al., "Inferring Access-Control Policy Properties via Machine Learning", IEEE, 2006, 4 pages.
(Continued)

Primary Examiner — Minh Dinh
(74) Attorney, Agent, or Firm — Kilpatrick Townsend & Stockton LLP

(57) ABSTRACT

In some embodiments, a resource security system may determine an access request outcome (e.g., accept, reject, or review) for an access request based on access rules. The resource security system may generate and select the access rules to be used for using stability information. For instance, the resource security system may select a training set from the received access requests, e.g., including recently received access requests, and generate a plurality of potential access rules based on the training set. The resource security system may determine and compare the detection performance and the stability performance of the potential access rules. The resource security system may select the best performing potential access rules to be used in operation for determining the outcome of access requests.

20 Claims, 12 Drawing Sheets

Related U.S. Application Data continuation of application No. 15/352,491, filed on Nov. 15, 2016, now Pat. No. 9,853,993.

(51) Int. Cl.
*G06Q 20/38* (2012.01)
*G06Q 20/40* (2012.01)

(52) U.S. Cl.
CPC ......... *G06Q 20/401* (2013.01); *H04L 63/108* (2013.01); *H04L 63/205* (2013.01); *H04L 63/107* (2013.01)

(56) References Cited

U.S. PATENT DOCUMENTS

| | | |
|---|---|---|
| 2010/0094765 A1 | 4/2010 | Nandy |
| 2010/0325710 A1 | 12/2010 | Etchegoyen |
| 2013/0346294 A1 | 12/2013 | Faith et al. |
| 2014/0012724 A1 | 1/2014 | O'leary et al. |
| 2015/0373054 A1 | 12/2015 | Chapman, II et al. |
| 2016/0078203 A1 | 3/2016 | Moloian et al. |

OTHER PUBLICATIONS

PCT/US2017/061180, "International Search Report and Written Opinion", dated Feb. 9, 2018, 10 pages.

Xu et al., "Mining Attribute-Based Access Control Policies from Logs", Department of Computer Science, IFIP,, Apr. 21, 2017, 16 pages.

SYSTEMS AND METHODS FOR SECURING ACCESS TO RESOURCES

CROSS-REFERENCES TO RELATED APPLICATIONS

This present application is a continuation application of U.S. application Ser. No. 15/812,334, filed Nov. 14, 2017, entitled "SYSTEMS AND METHODS FOR GENERATION AND SELECTION OF ACCESS RULES" which is a continuation of U.S. patent application Ser. No. 15/352,491, filed Nov. 15, 2016, entitled "SYSTEMS AND METHODS FOR GENERATION AND SELECTION OF ACCESS RULES", now U.S. Pat. No. 9,853,993, issued Dec. 26, 2017, the entire contents of which are herein incorporated by reference for all purposes.

BACKGROUND

An unauthorized user may fraudulently request access to a resource using the authorization information of an authorized user. To prevent unauthorized access, a resource security system may implement access rules to reject access requests having certain parameters that are indicative of fraud. However, in response to being denied access, the unauthorized user may change their method for making fraudulent access requests, thereby changing the parameters, in order to avoid rejection by the access rules. In addition, authorized users may also change their methods for making legitimate access requests over time. Consequently, the performance of the access rules may degrade over time, increasingly denying access to authorized users or increasingly granting access to unauthorized users. Accordingly, there is a need for improved systems and methods for securing access to resources.

BRIEF SUMMARY

In some embodiments, a resource security system may determine an access request outcome (e.g., accept, reject, or review) for an access request based on access rules. The resource security system may generate and select the access rules based on their performance and their stability over time. For instance, the resource security system may select a training subset from the set of received access requests, e.g., including recently received access requests, and generate a plurality of potential access rules based on the training set. The resource security system may determine and compare the performance and the stability of the potential access rules. The resource security system may select the best performing and most stable potential access rules to be used for determining the outcome of an access request.

In some embodiments, the resource security system may determine and track the triggering percentage and the predictive percentage for each potential access rule over time. The resource security system may then determine the stability of the triggering percentage and the predictive percentage for each potential access rule. In some embodiments, the resource security system may determine the predictive percentage and its stability based on an expected delay in the reporting of fraudulent access. Accordingly, the access rule generation system may select access rules that have high fraud predictive percentages and that are stable over time, thereby reducing fraudulent access and also reducing false positives.

Other embodiments are directed to systems, portable consumer devices, and computer readable media associated with methods described herein.

A better understanding of the nature and advantages of embodiments of the present invention may be gained with reference to the following detailed description and the accompanying drawings.

Terms

Figure 1:
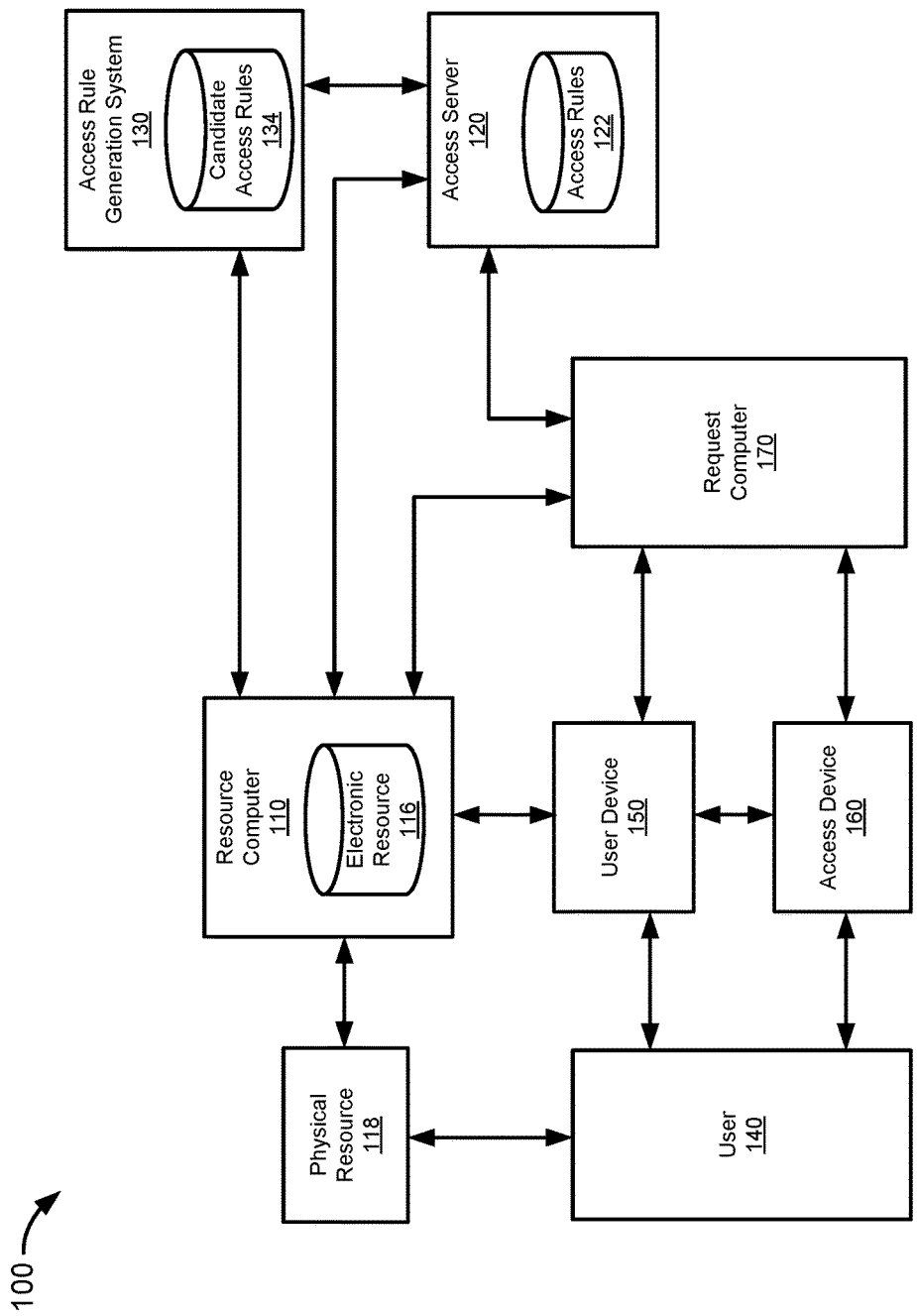
FIG. 1 shows a resource security system for authorizing access to resources, in accordance with some embodiments

Prior to discussing embodiments of the invention, description of some terms may be helpful in understanding embodiments of the invention.

The term "resource" generally refers to any asset that may be used or consumed. For example, the resource may be an electronic resource (e.g., stored data, received data, a computer account, a network-based account, an email inbox), a physical resource (e.g., a tangible object, a building, a safe, or a physical location), or other electronic communications between computers (e.g., a communication signal corresponding to an account for performing a transaction).

The term "access request" generally refers to a request to access a resource. The access request may be received from a requesting computer, a user device, or a resource computer, for example. The access request may include authorization information, such as a user name, account number, or password. The access request may also include and access request parameters, such as an access request identifier, a resource identifier, a timestamp, a date, a device or computer identifier, a geo-location, or any other suitable information.

The term "access rule" may include any procedure or definition used to determine an access rule outcome for an access request based on certain criteria. In some embodiments, the rule may comprise one or more rule conditions and an associated rule outcome. A "rule condition" may specify a logical expression describing the circumstances under which the outcome is determined for the rule. A condition of the access rule may be involved by an access request parameter based on the parameter having a specific parameter value, based on the parameter value being within a certain range, based on the parameter value being above or below a threshold, or any combination thereof.

An "access rule outcome" of an access rule may represent an outcome determined by that rule based on one or more conditions of the rule and the parameters of the access request. For example, an access rule may provide an access rule outcome of either "reject," "accept," or "review," when its conditions are involved by an access request.

The term "access request outcome" may include any determination of whether to grant access to the resource. The access request outcomes may include "accept," "reject," or "review." In some embodiments, an access request outcome for an access request may be "reject" if any of the access rules have an access rule outcome of "reject." In some embodiments, an access request outcome for an access request may be "accept" if any of the access rules have an access rule outcome of "accept," regardless of any outcome being "reject." An access request outcome of "accept" may cause the access request to be granted. An access request outcome of "reject" may cause the access request to be denied. The "review" outcome may initiate a review process for the access request. In various embodiments, other outcomes or other meanings of these outcomes may be used.

The term "triggering percentage" is a metric that describes the percentage of access requests received over a certain period of time that satisfy (e.g., involve or meet) one or more conditions of a certain access rule. That is, the access rule is "triggered" by an access request that involves the conditions of the access rule. In one example, an access rule may be triggered by 100 access requests out of 1,000,000 access requests received in one month. That is, the "triggering frequency" of the access rule is 100 per month. Accordingly, the triggering percentage of the access rule over that one month is 0.01% (e.g., 100÷1,000,000).

The term "predictive percentage" refers to the percentage of access requests triggering an access rule that are predicted to be fraudulent. The fraud predictive percentage may be determined based on reports of fraudulent (e.g., invalid of unauthorized) access requests. For example, if an access rule is triggered by 100 access requests within a certain time period and 90 of those access requests are reported to be fraudulent, then the predictive percentage of the access rule for that time period may be determined to be 90% (e.g., 90÷100).

The term "reporting" generally refers to a process for identifying whether an access request was fraudulent or legitimate. Reporting may involve a user of a resource reporting unauthorized use to the owner or operator of the resource. For example, an owner of a payment account may initiate a charge-back for a fraudulent transaction on their account. In another example, a user of an email account may report a certain email as being "junk" or "spam" mail. In some situations, an authorized user of a resource may report a denial of access to the resource. For example, a user may report that a legitimate transaction was denied, or the user may report that an email is "not-spam." Such reporting may be used to determine validity information (e.g., valid/legitimate or invalid/fraudulent) for the corresponding access request.

The term "server computer" may include a powerful computer or cluster of computers. For example, the server computer can be a large mainframe, a minicomputer cluster, or a group of computers functioning as a unit. In one example, the server computer may be a database server coupled to a web server. The server computer may be coupled to a database and may include any hardware, software, other logic, or combination of the preceding for servicing the requests from one or more other computers. The term "computer system" may generally refer to a system including one or more server computers coupled to one or more databases.

As used herein, the term "providing" may include sending, transmitting, making available on a web page, for downloading, through an application, displaying or rendering, or any other suitable method. In various embodiments of the invention, rule profiles, rule outcome frequencies, and rule outcome disposition frequencies may be provided in any suitable manner.

DETAILED DESCRIPTION

A resource security system may be used to grant or deny access to resources. In addition, the resource security system may implement access rules to reject access requests having parameters indicative of fraud. The resource security system may evaluate the performance of the access rules based on reports of fraudulent access. The resource security system may also compensate validity information for the access requests based on an expected reporting delay. Then, the resource security system may determine the stability of the rules performance over time and select stable rules to be implemented. Periodically, the resource security system may change or update the access rules based on their performance.

I. Resource Security System

A resource security system may receive requests to access a resource. The resource security system may include an access server for determining an outcome for the access request based on access rules. The resource security system may also include an access rule generation system for generating and selecting the access rules. The resource security system is described in further detail below.

A. Resource Security System for Securing Access to a Resource

FIG. 1 shows a resource security system 100 for authorizing access to resources, in accordance with some embodiments. The resource security system 100 may be used to provide authorized users access to a resource while denying access to unauthorized users. In addition, the resource security system 100 may be used to deny fraudulent access requests that appear to be legitimate access requests of authorized users. The resource security system 100 may implement access rules to identify fraudulent access requests based on parameters of the access request. The access rules may be selected based on their performance and their stability over time.

The resource security system 100 includes a resource computer 110. The resource computer 110 may control access to a physical resource 118, such as a building or a lockbox, or an electronic resource 116, such as a local computer account, digital files or documents, a network database, an email inbox, a payment account, or a website login. In some embodiments, the resource computer may be a webserver, an email server, or a server of an account issuer. The resource computer 110 may receive an access request from a user 140 via a user device 150 (e.g., a computer or a mobile phone) of the user 140. The resource computer 110 may also receive the access request from the user 140 via a request computer 170 coupled with an access device 160 (e.g., a keypad or a terminal). In some embodiments, the request computer 170 may be a service provider that is different from the resource provider.

The access device 160 and the user device 150 may include a user input interface such as a keypad, a keyboard, a finger print reader, a retina scanner, any other type of biometric reader, a magnetic stripe reader, a chip card reader, a radio frequency identification reader, or a wireless or contactless communication interface, for example. The user 140 may input authorization information into the access device 160 or the user device 150 to access the resource. The authorization information may include one or more of a user name, an account number, a token, a password, a personal identification number, a signature, and a digital certificate, for example. In response to receiving authorization information input by the user 140, the user device 150 or the request computer 170 may send an access request to the resource computer 110 along with one or more parameters of the access request. The access request may include the authorization information provided by the user 140.

In one example, the user 140 may enter one or more of an account number, a personal identification number, and password into the access device 160, to request access to a physical resource (e.g., to open a locked security door in order to access a building or a lockbox) and the request computer 170 may generate and send an access request to the resource computer 110 to request access to the resource. In another example, the user 140 may operate the user device 150 to request that the resource computer 110 provide access to the electronic resource 116 (e.g., a website or a file) that is hosted by the resource computer 110. In another example, the user device 150 may send an access request (e.g., an email) to the resource computer 110 (e.g., an email server) in order to provide data to the electronic resource 116 (e.g., deliver the email to an inbox). In another example, the user 140 may provide an account number and/or a personal identification number to an access device 160 in order to request access to a resource (e.g., a payment account) for conducting a transaction.

In some embodiments, the resource computer 110 may verify the authorization information of the access request based on information stored at the request computer 170. In other embodiments, the request computer 170 may verify the authorization information of the access request based on information stored at the resource computer 110.

The resource computer 110 may receive the request substantially in real-time (e.g., account for delays computer processing and electronic communication). Once the access request is received, the resource computer 110 may determine parameters of the access request. In some embodiments, the parameters may be provided by the user device 150 or the request computer 170. For example, the parameters may include one or more of: a time that the access request was received, a day of the week that the access request was received, the source-location of the access request, the amount of resources requested, an identifier of the resource being request, an identifier of the user 140, the access device 160, the user device 150, the request computer 170, a location of the user 140, the access device 160, the user device 150, the request computer 170, an indication of when, where, or how the access request is received by the resource computer 110, an indication of when, where, or how the access request is sent by the user 140 or the user device 150, an indication of the requested use of the electronic resource 116 or the physical resource 118, and an indication of the type, status, amount, or form of the resource being requested. In other embodiments, the request computer 170 or the access server 120 may determine the parameters of the access request.

While the access request may include proper authentication information, the resource computer may send the parameters of the access request to the access server 120 in order to determine whether the access request is fraudulent. The access server 120 may store one or more access rules 122 for identifying a fraudulent access request. Each of the access rules 122 may include one or more conditions corresponding to one or more parameters of the access request. The access server 120 may determine an access request outcome indicating whether the access request should be accepted (e.g., access to the resource granted), rejected (e.g., access to the resource denied), or reviewed by comparing the access rules 122 to the parameters of the access request as further described below. In some embodiments, instead of determining an access request outcome, the access server 120 may determine an evaluation score based on outcomes of the access rules. The evaluation score may indicate the risk or likelihood of the access require being fraudulent. If the evaluation score indicates that the access request is likely to be fraudulent, then the access server 120 may reject the access request.

The access server 120 may send the indication of the access request outcome to the resource computer 110 (e.g., accept, reject, or review). In some embodiments, the access server 120 may send the evaluation score to the resource computer 110 instead. The resource computer 110 may then grant or deny access to the resource based on the indication of the access request outcome or based on the evaluation score. The resource computer 110 may also initiate a review process for the access request.

In some embodiments, the access server 120 may be remotely accessed by a user. The access server 120 may store data in a secure environment and implement user privileges and user role management for accessing different types of stored data. For example, user privileges may be set to enable users to perform one or more of the following operations: view logs of received access request, view logs of access request outcomes, enable or disable the execution of the access rules 122, update or modify the access rules 122, change certain access request outcomes. Different privileges may be set for different users.

The resource computer 110 may store access request information for each access requests that it receives. The access request information may include the parameters of each of the access requests. The access request information may also include an indication of the access request outcome for the access request. The resource computer 110 may also store validity information corresponding to each access request. The validity information for an access request may be initially based on its access request outcome. The validity information may be updated based on whether the access request is reported to be fraudulent. In some embodiments, the access server 120 or the request computer 170 may store the access request information and the validity information.

The access rules 122 implemented by the access server 120 may be generated by an access rule generation system 130. The access rule generation system 130 may generate candidate access rules 134 for the access server 120 based on the access request information and the validity information. The access rule generation system 130 may receive the access request information and the validity information corresponding to the access request information from the resource computer 110 or the access server 120. The access rules 122 implemented by the access server 120 may include some or all of the candidate access rules 134.

The access rule generation system 130 may periodically re-generate the candidate access rules 134 based on new or updated access request information and new or updated validity information. As such, the candidate access rules 134 may be based on the most recent patterns of fraudulent resource use and the most recent patterns of legitimate resource use. The generation and selection of candidate access rules is further described below.

B. Access Server for Determining an Access Request Outcome

Figure 2:
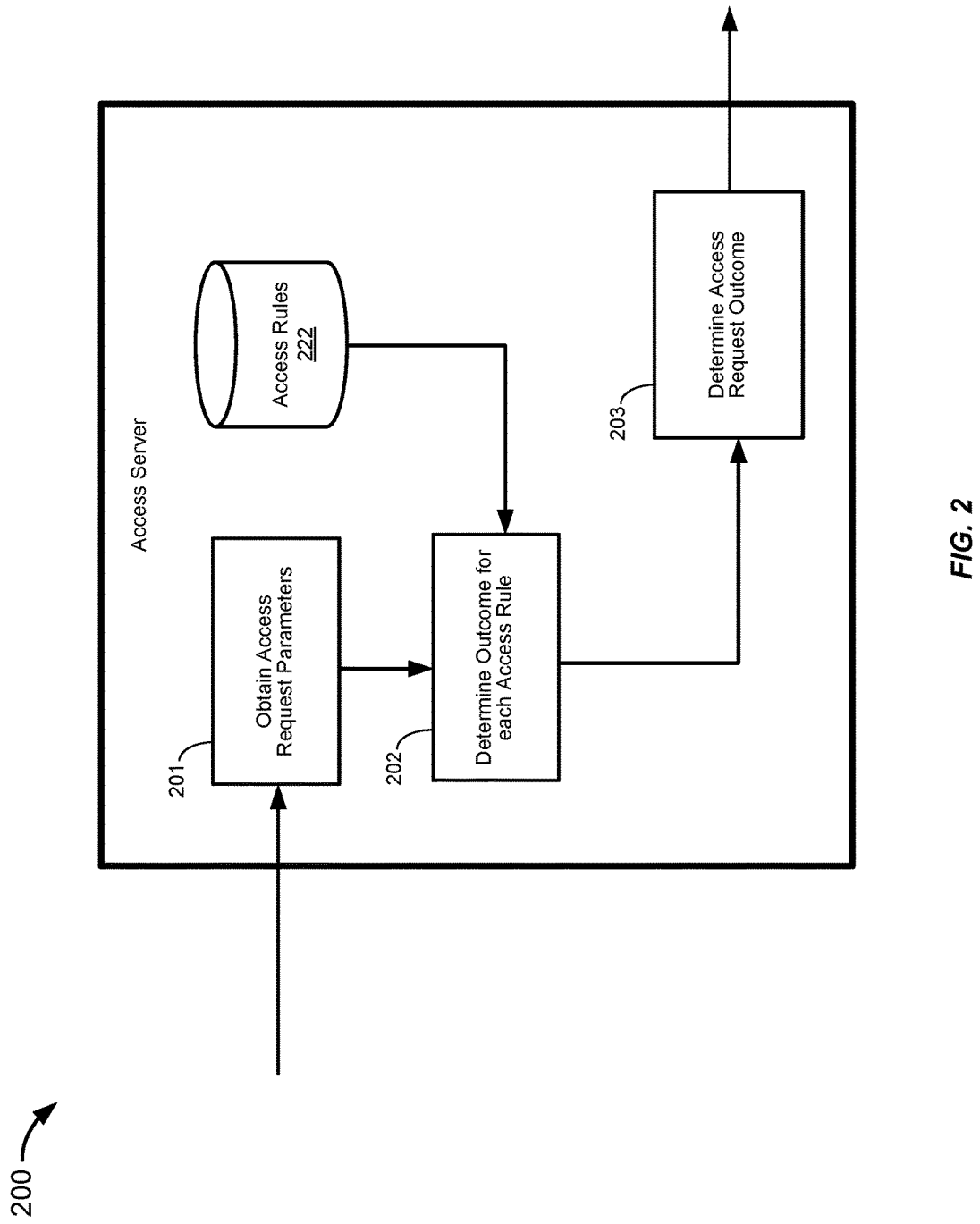
FIG. 2 shows a functional block diagram of an access server for determining an access request outcome, in accordance with some embodiments.

FIG. 2 shows a functional block diagram of an access server 200 for determining an access request outcome, in accordance with some embodiments. A resource computer may provide the parameters of an access request to the access server 200 to determine whether the access request is fraudulent. The access server 200 may implement access rules 222 to determine the access request outcome or an evaluation score based on the parameters of the access request. The access server may load the access rules 222 into a system memory of the access server. The access server 200 may then provide the outcome or an evaluation score back to the resource computer, which may grant or deny access to the resource accordingly.

The access server 200 may operate similar to the access server 120 of FIG. 1 described above. The access server 200 may be used in a resource access system similar to the resource access system 100 of FIG. 1 described above. The access server 200 may store one or more access rules 222. The access rules 222 may be generated by and received from an access rule generation system. The one or more access rules 222 may be loaded into a memory of the access server 200 to be used in determining an access request outcome.

At 201, the access server 200 may obtain the access request parameters for a certain access request. The access request parameters may be received from a resource computer or from a request computer. The access request and/or the access request parameters may be received by from access server 200 from the resource computer over a network in real-time. The parameters may include, for example, one or more of the time that the access request was received, the day of the week that the access request was received, the source-location of the access request, the amount of resources requested, an identifier of the resource being request, an identifier of the user 140, the access device 160, the user device 150, the request computer 170, a location of the user 140, the access device 160, the user device 150, the request computer 170, an indication of when, where, or how the access request is received by the resource computer 110, an indication of when, where, or how the access request is sent by the user 140 or the user device 150, an indication of the requested use of the electronic resource 116 or the physical resource 118, and an indication of the type, status, amount, or form of the resource being requested may determine the parameters of the access request. In some embodiments, the user 140, the user device 150, the access device 160, or the request computer 170 may provide one or more parameters of the access request.

In response to obtaining the access request parameters, the access server 200 may access the system memory of the access server 200 to obtain the access rules. At 202, the access server 200 may determine an access rule outcome for each access rule 222. Each access rules 222 includes certain conditions that may be satisfied by the parameters of the access request. The access server 200 may compare the parameters of the access request to the conditions of each access rule 222 to determine whether an access rule 222 is triggered by the access request. Each access rule 222 may have an associated access rule outcome. In some embodiments the access rule outcome may indicate accept, reject, or review. In some embodiments the access rule outcome may be an evaluation score.

In one example of determining an access rule outcome, an access request may be for a website account login and the parameters of the access request may include a "source location" indicating the geographic location of the user or device that is requesting access and an "authorized user location" indicating the geographic location of the authorized user of the website account. In this example, a certain access rule may have conditions that are satisfied (e.g., triggered) when the "source location" does not match the "authorized user location," and that access rule may have an outcome of "reject." Accordingly, an access request coming from a geographic location that does not match the geographic location of the authorized user may be rejected.

In another example of determining an access rule outcome, an access request may be for a payment transaction and the parameters of the access request may include the "transaction amount" and the "shipping country" for shipping goods purchased in the transaction. In this example, a certain access rule may have conditions that are satisfied when the "transaction amount" is over $1,000 and when the "shipping country" is a country having high reporting of fraud. This access rule may have an access request outcome of "reject." Accordingly, a access request for a transaction to ship goods amounting to over $1,000 to a certain country may be rejected.

In another example of determining an access rule outcome, an access request may be for delivering an email message to an inbox and the parameters of the access request may include one or more alphanumeric keywords from then email message and a "source IP address" of the email message. In this example, a certain access rule may have conditions that are satisfied when one or more of the keyword parameters matches one or more stored key words indicating "spam" email. That access rule may also have conditions that are satisfied when the IP address falls within a certain range of IP addresses reported to be spam. Accordingly, a spam email message may not be delivered to an inbox when it contains certain keywords and it is sent from certain IP addresses.

At 203, after determining the access rule outcome for each of the access rules 222, the access server 200 may determine an access request outcome. The access request outcome may be accept, reject, or review. For example, the access server 200 may determine an access request outcome of "accept" if any of the access rule outcomes are "accept." In another example, the access server 200 may determine an access request outcome of "reject" if one or more of the access rule outcomes are "reject" and none of the access rule outcomes are "accept." In another example, the access server 200 may determine an access request outcome of "review" if one or more of the access rule outcomes are "reject" and one or more of the access rule outcomes are "accept." In other embodiments, the access server 200 may determine an evaluation score based on the access rule outcomes. The access server 200 may send the access request outcome or the evaluation score to the resource computer.

After determining the access request outcome at 203, the access server 200 may provide an indication of the access request outcome back to the computer that sent the access request or access request parameters to the access server 200 (e.g., the resource computer or the request computer). The resource computer may receive the indication of the access request outcome and provide access to the resource based on the access request outcome.

In some embodiments, when the access rule outcome is "reject," the access server 200 may decide to evaluate the performance of the triggered access rule by changing the access rule outcome to "accept" instead. By accepting the access request, the performance of the triggered access rule may be evaluated since the access request may be reported as fraudulent. Therefore, if fraudulent access is not reported for the triggered access rule, then the triggering of the access rule was a false positive.

The access server 200 may determine whether to evaluate the access rule based on different criteria, such as the number of access requests received overall, the number of access requests received that triggered this access rule, the amount of time since the last evaluation, the amount of time since the this access rule was evaluated, or based on a random number generator.

Evaluating the access rules 222 currently implemented by the access server 200 may be advantageous since the access rules 222 may have been generated based on patterns of fraudulent and legitimate access requests that have changed over time. Therefore, by accepting the access request instead of rejecting it, it is possible determine the performance of the currently implemented access rules 222 based on reports received for the access request triggering the access rules 222. That is, the percentage of true positives and the percentage of false positives generated by each access rule 222 may be determined based on validity information corresponding to the reports.

C. System for Generating and Selecting Access Rules

Figure 3:
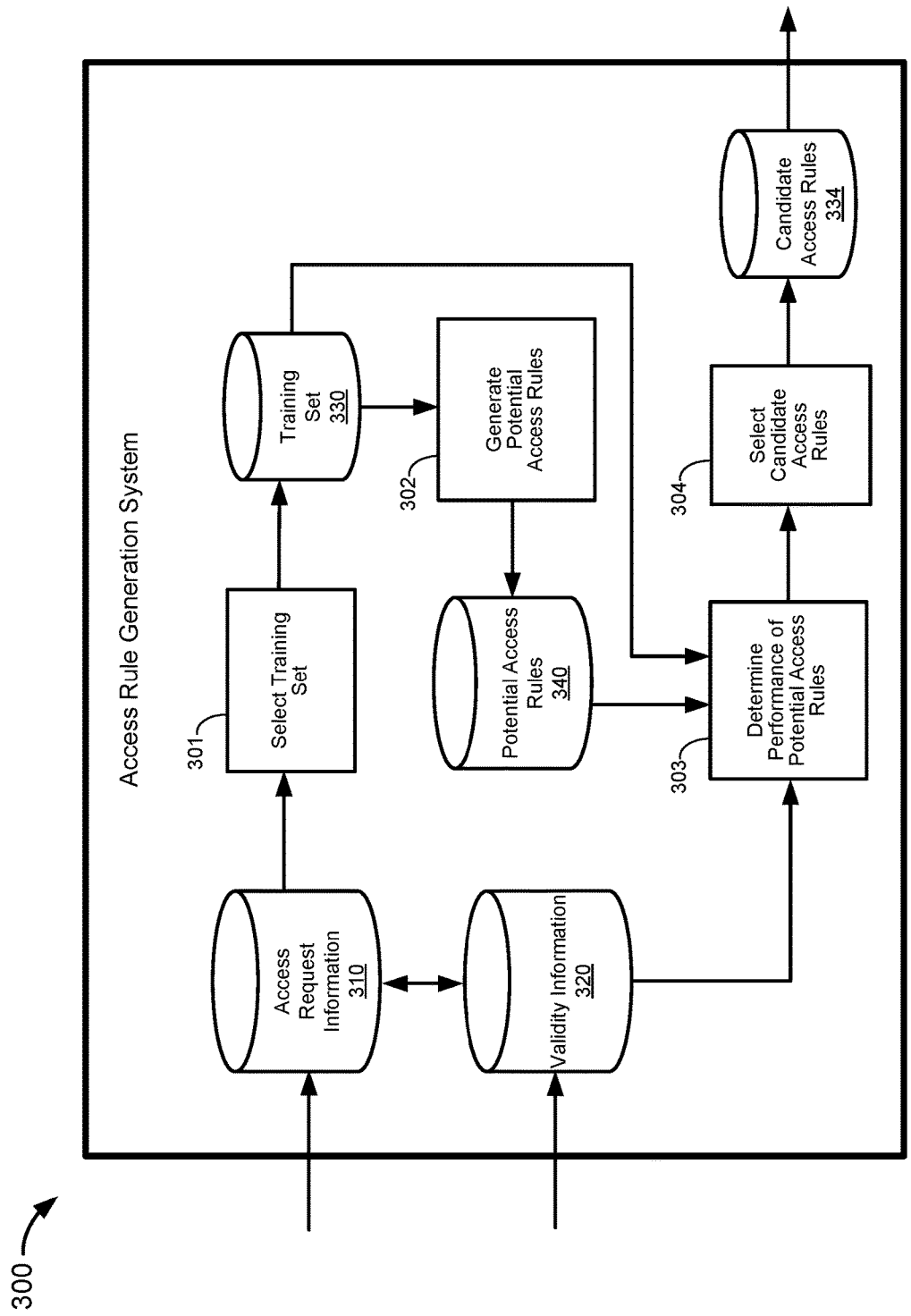
FIG. 3 shows a functional block diagram of an access rule generation system for generating and selecting access rules, in accordance with some embodiments.

FIG. 3 shows a functional block diagram of an access rule generation system 300 for generating and selecting access rules, in accordance with some embodiments. The access rule generation system 300 may generate the candidate access rules 324 based on previously received access requests and corresponding validity information. The access rule generation system 300 may then provide the candidate access rules 324 to an access server to be used for determine an access request outcome. The access rule generation system 300 may operate similar to the access rule generation system 130 of FIG. 1. The access rule generation system 300 may be implemented in a resource access system similar to the resource access system 100 of FIG. 1 described above.

The access rule generation system 300 may store access request information 310 and corresponding validity information 320 for use in generating candidate access rules 324. The access request information 310 and the validity information 320 may be received from a resource computer, a request computer, or an access server. At 301, the access rule generation system 300 may select a subset of access requests from the stored access request information 310 to obtain a training set 330 of access requests for use in generating the candidate access rules 324. The access rule generation system 300 may select access requests to be included in the training set 330 based on the time and date when the access request was received. For example, the access rule generation system 300 may select access requests that occurred within a time period between six months ago and eighteen months ago. In some embodiments, the access rule generation system 300 may not select access requests occurring within the past six months because there may be a delay of up to six months in reporting fraudulent access requests. In other embodiments, the access rule generation system 300 may also select other time periods.

The access rule generation system 300 may also select the training set such that it includes both recent access requests (e.g., those occurring within the past eighteen months) and historical access requests (e.g., those occurring more than eighteen months ago). As such, the training set may contain access requests that are representative of both recent patterns of fraud and older patterns of fraud. Accordingly, the candidate access rules generated based on this training set may detect fraud made according to both new and old methods or patterns.

At 302, the access rule generation system 300 may generate a plurality of potential access rules 340 based on the training set 330 of access requests. In some embodiments, the access rule generation system 300 may generate the potential access rules based on a decision tree. For instance, each node of the decision tree may represent a condition of an access rule parameter and branches of the decision tree may represent potential access rules 340. In some embodiments, each access rule of the potential access rules 340 may have conditions that are mutually exclusive to the conditions of the other potential access rules. That is, an access request of the training set 330 may only satisfy (e.g., trigger) the conditions of a single access rule of the potential access rules 340.

In some embodiments, instead of selecting all of the possible rules that may be generated using a training set 330, the access rule generation system 300 may generate the potential access rules 340 by selecting branches of the decision tree that are known to have higher fraud predictive percentages based on historic information. This method may generate fewer potential access rules 340, thereby reducing the amount of computing and storage resources used in generating and evaluating potential access rules 340 for candidate access rule selection.

After generating the plurality of potential access rules 340, the access rule generation system 300 may determine, at 303, the performance of each of the potential access rule 340. The performance of a potential access rule may be based on the validity information 320 corresponding to the access requests of the training set 330 that satisfy the conditions of the potential access rule. For example, access rule generation system 300 may determine the performance of a potential access rule 340 based on the percentage of access requests in the training set 330 triggering the potential access rule which are reported to be fraudulent (e.g., the predictive percentage). As such, the performance of an access rule is aggregating across all of the triggering access requests in the training set.

At 304, the access rule generation system 300 may select a set of candidate access rules 334 from the potential access rules 340 by comparing the performances of the potential access rues 340. For example, the access rule generation system 300 may select the twenty best performing potential access rules to comprise the set of candidate access rules 334. In some embodiments, the access rule generation system 300 may also select a different number of candidate access rules 334. The candidate access rules 334 may be provided to the operator of the resource and some or all of the candidate access rules 334 made be used as the access rules implemented by an access server.

II. Stability Analysis of Access Rules Over Time

The selection of candidate access rules may be based on the stability of a potential access rule in addition to its performance. While the performance of an access rule may be based on the aggregated predictive percentage across all access requests in the training set, the stability of an access rule may account for trends or variations in performance over time. As such, selecting candidate access rules based on their stability may provide more consistency in the access request outcomes.

A. Stability of Triggering Percentage of an Access Rule Over Time

The triggering percentage of an access rule may be determined based on the percentage of access requests in the training set that that involve (i.e., satisfy) one or more conditions of that access rule. In general, when the triggering percentage of an access rule increases, the amount of false positives generated by the access rule also increases. In order to reduce false positives, an access rule generation system may select access rules having higher triggering stability.

Figure 4:
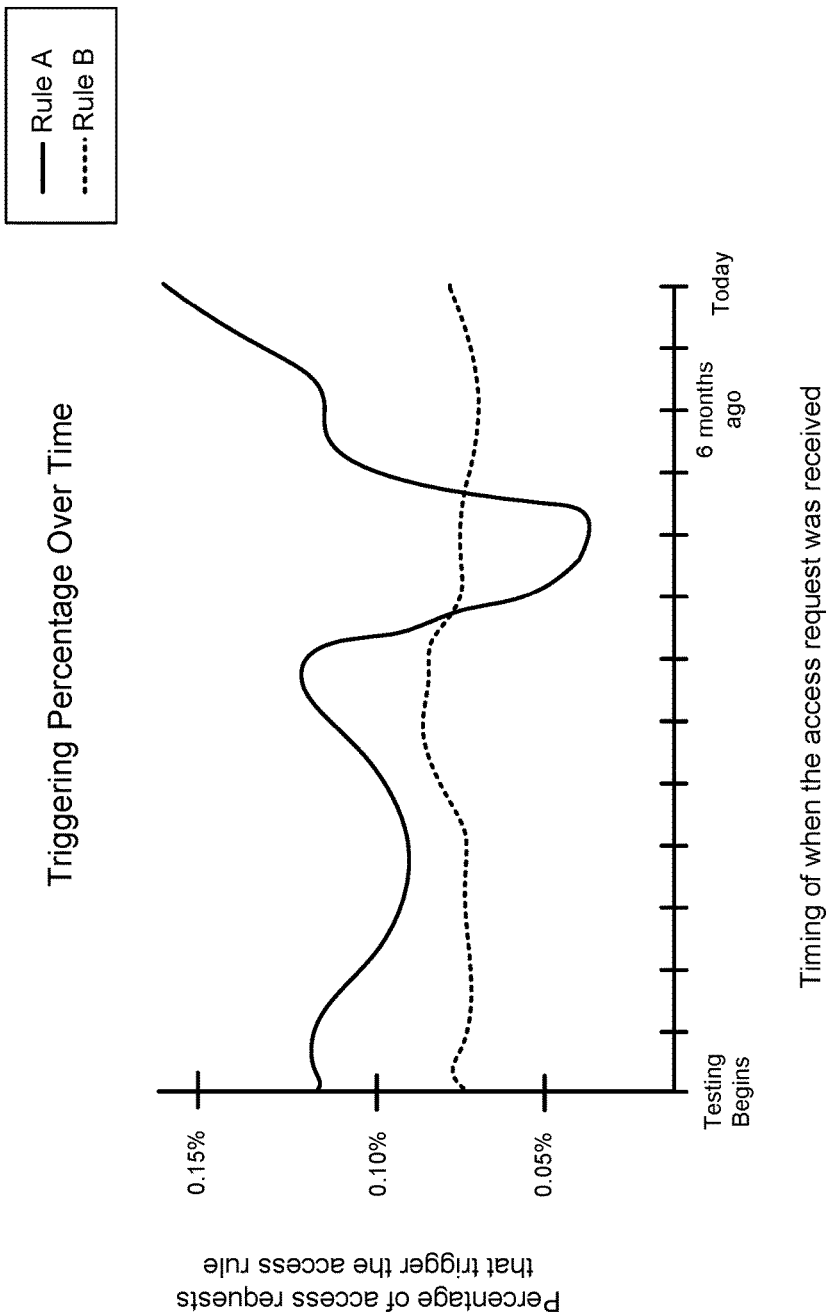
FIG. 4 shows an exemplary graph of triggering percentages for two access rules over time, in accordance with some embodiments.

FIG. 4 shows an exemplary graph 400 of triggering percentages for two access rules over time, in accordance with some embodiments. The graph 400 shows the triggering percentage of a first rule, Rule A (indicated by a solid line), according to the date that the access request was received. The graph 400 also shows the triggering percentage of a second rule, Rule B (indicated by a dashed line), according to the date that the access request was received.

In general, when the triggering percentage increases, the amount of false positives also increases, and thus, the predictive percentage decreases. For example, fraudsters may realize that their fraudulent access requests are being rejected and they may change their manner of committing fraud to avoid being rejected by the access rules. However, the behavior of legitimate users may not change as much over time. As such, the false positive percentage for an access rule may increase over time as fraudsters stop making access requests according to the patterns being rejected by that access rule. Therefore, it is advantageous to track the stability of the triggering percentage over time since the triggering percentage can be directly determined from the received access requests. That is, the triggering percentage is not dependent upon reporting, whereas the predictive percentage is.

As shown in the graph 400, Rule A may have had a triggering percentage that is over 0.10% at the time when testing of the access rules began. Between the time that testing began and 6 months ago, the triggering percentage of Rule A may have dropped below 0.05% for a period of time and then risen back up to over 0.10% later. Then, the triggering percentage of Rule A may have risen to over 0.15% by today, when rule generation and selection is being performed. Thus, the triggering percentage of Rule A has fluctuated from under 0.05% to over 0.15% since testing began.

As shown in the graph 400, Rule B may have had a triggering percentage that was greater than 0.05% but less than 0.10% since the time when testing began until today. As such, the triggering percentage of Rule B has less variation over time compared to the triggering percentage of Rule A. The variation of the triggering percentages for Rule A may indicate that Rule A is more sensitive to changes in user behavior than Rule B, which may make Rule A less accurate during certain periods of time, and thus, less consistent compared to Rule B.

The rule generation computer may determine a triggering stability rating for an access rule based on the variation of the triggering percentages over time. For example, the rule generation computer may segment the access requests of the training set into time-based subsets based on the timing of when the access requests were received. Each segment may correspond to a certain time-period (e.g., time window). The rule generation computer may then determine the triggering percentages for each of the time-based segments and compute the variation of the triggering percentages. In some embodiments, the access request may be segmented week-by-week or day-by-day. In other embodiments, the access requests may be segmented using a sliding window such that the triggering percentages are calculated each day over a one week window.

Based on the variation of the triggering percentages of the segments, the rule generation computer may determine that Rule B has a higher triggering stability rating compared to Rule A, since the triggering percentage of Rule B varies less over time. The access rule generation system may use the triggering stability ratings of the potential access rules to select candidate access rules that are stable, and thus, more accurate and more consistent over time.

B. Stability of the Predictive Percentage of an Access Rule Over Time

The predictive percentage may be determined based on the percentage of access requests triggering an access rule that are reported to fraudulent. Certain access rules may have a high predictive percentage in the aggregate but they may be sensitive to changes in access request behavior during certain periods of time. In order to reduce false positives, an access rule generating system may determine the predictive percentage of an access rule over time and select access rules having higher detection stability.

Figure 5:
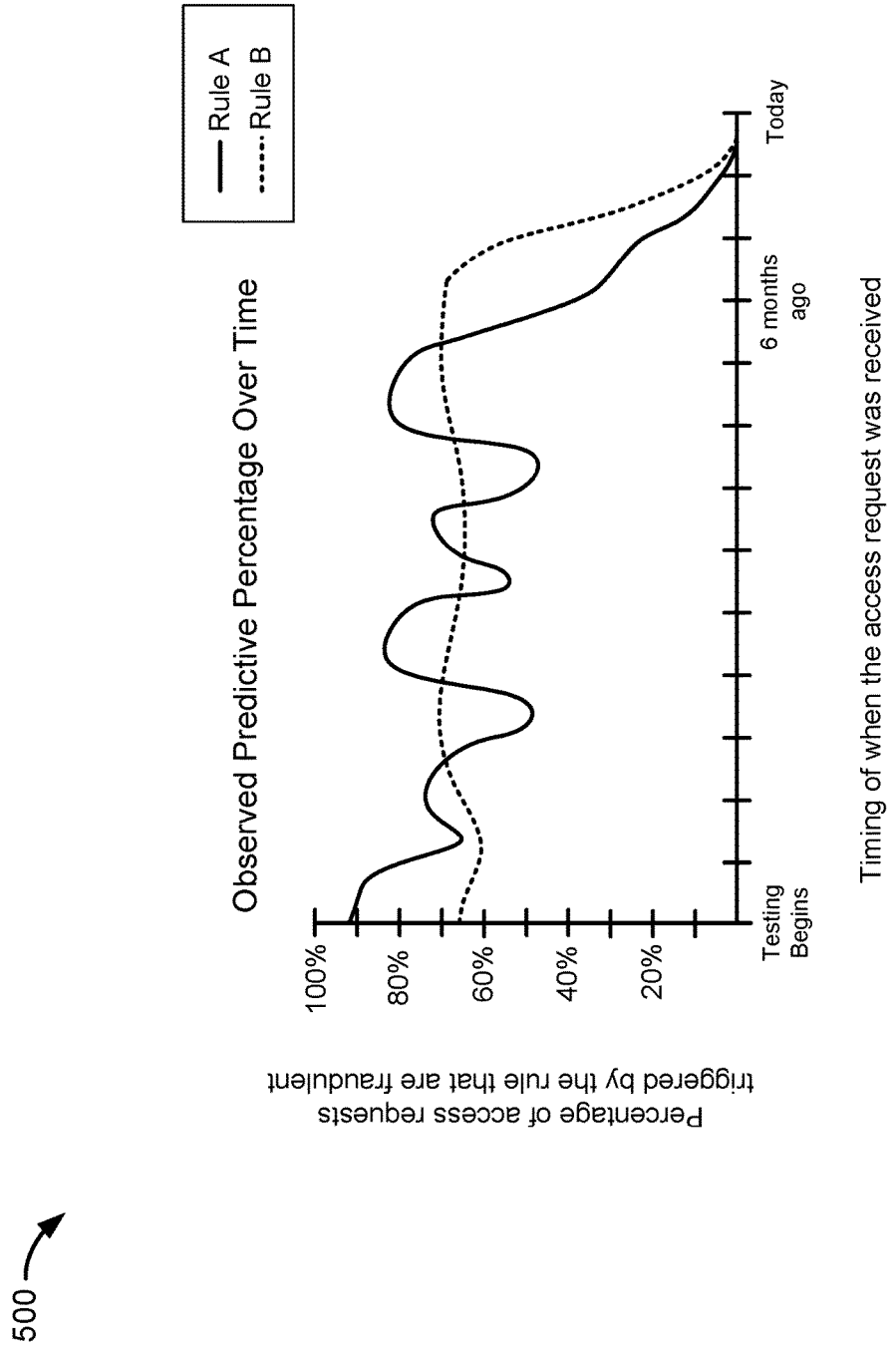
FIG. 5 shows an exemplary graph of the observed predictive percentages for two access rules over time, in accordance with some embodiments.

FIG. 5 shows an exemplary graph 500 of the observed predictive percentages for two access rules over time, in accordance with some embodiments. The graph 500 shows the percentage of access requests triggering a first rule, Rule A (indicated by a solid line), that are fraudulent according to the date that the access requests were received (e.g., an observed predictive percentage). The graph 500 also shows the percentage of access requests triggering a second rule, Rule B (indicated by a dashed line), that are fraudulent according to the date that the access requests were received. The observed predictive percentage may be based on the validity information corresponding to the access requests.

As shown in the graph 500, Rule A may have an observed predictive percentage that varies from over 90% to under 40%, with several variations between 50% and 70% over the time from when testing began to 6 months ago. As shown in the graph 500, Rule B may have an observed predictive percentage that varies between 60% and 70% over the time from when testing began to 6 months ago. As such, the observed predictive percentage of Rule B has less variation over time compared to the observed predictive percentage of Rule A. The larger variation in the observed percentage for Rule A may indicate that Rule A is sensitive to changes in user behavior, thereby making Rule A less accurate during certain periods of time.

As further described below, the access rule generation system may determine a detection stability rating for an access rule based on trends in the variation of the observed predictive percentages over time. For example, the rule generation computer may segment the access requests of the training set into time-based subsets based on the timing of when the access requests were received. Each segment may correspond to a certain time-period (e.g., time window). The rule generation computer may then determine the triggering percentages for each of the time-based segments and compute the variation of the triggering percentages. In some embodiments, the access request may be segmented week-by-week or day-by-day. In other embodiments, the access requests may be segmented using a sliding window such that the triggering percentages are calculated each day over a one week window.

Based on trends in the variation of the predictive percentages for the segments, the access rule generation system may determine that Rule B has a higher detection stability rating compared to Rule A, since the observed predictive percentage of Rule B varies less over time. The access rule generation system may use the detection stability ratings of the potential access rules to select candidate access rules that are stable, and thus, more accurate and more consistent over time.

Figure 6:
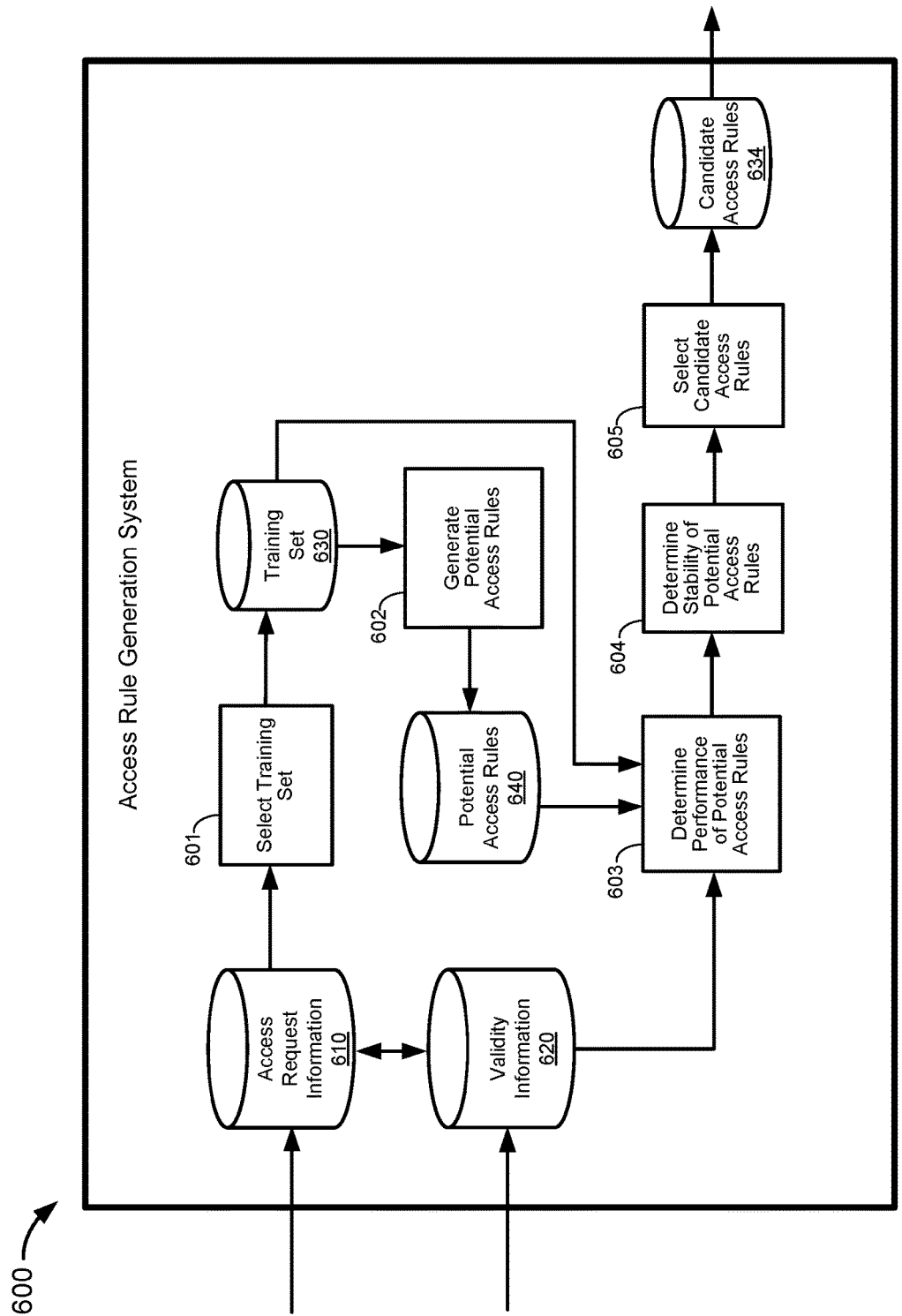
FIG. 6 shows a functional block diagram of an access rule generation system for generating and selecting access rules that are stable over time, in accordance with some embodiments.

C. System for Generating and Selecting Access Rules that are Stable Over Time FIG. 6 shows a functional block diagram of an access rule generation system 600 for generating and selecting access rules that are stable over time, in accordance with some embodiments. The access rule generation system 600 may determine the variation of the triggering percentage and the predictive percentage and select candidate access rules having higher stability ratings.

The access rule generation system 600 may operate similar to the access rule generation system 130 of FIG. 1 and the access rule generation system 300 of FIG. 3. The access rule generation system 300 may be implemented in a resource access system similar to the resource access system 100 of FIG. 1 described above.

The access rule generation system 600 may store access request information 610 and corresponding validity information 620 for use in generating candidate access rules 624. The access request information 610 and the validity information 620 may be received from a resource computer, a request computer, or an access server. At 601, the access rule generation system 600 may select a subset of access requests from the stored access request information 610 to obtain a training set 630 of access requests for use in generating the candidate access rules 624. The access rule generation system 600 may select access requests to be included in the training set 630 based on the time and date when the access request was received. The access rule generation system 600 may also select the training set such that it includes both recent access requests (e.g., those occurring within the past eighteen months) and historical access requests (e.g., those occurring more than eighteen months ago).

At 602, the access rule generation system 600 may generate a plurality of potential access rules 640 based on the training set 630 of access requests. In some embodiments, the access rule generation system 600 may generate the potential access rules based on a decision tree. For instance, each node of the decision tree may represent a condition of an access rule parameter and branches of the decision tree may represent potential access rules 640.

After generating the plurality of potential access rules 640, the access rule generation system 600 may determine, at 603, the performance of each of the potential access rule 640. The performance of a potential access rule may be based on the validity information 620 corresponding to the access requests of the training set 630 that satisfy the conditions of the potential access rule. For example, access rule generation system 600 may determine a "total predictive percentage" for each of the potential access rules 940 based on all of the access requests in the training set 630 triggering that rule.

At 604, the access rule generation system 600 may determine the triggering stability and the detection stability of the potential access rules 640. The access rule generation system 600 may segment the access requests of the training set 630 into subsets according to different time periods (e.g., week by week, or month by month). In some embodiments, the segments may be based on a sliding window (e.g., a one week period calculated for each day). The access rule generation system 600 may determine a triggering percentages for each of the plurality of time-based subsets of access requests. The access rule generation system 600 may determine a triggering stability rating by comparing the plurality of triggering percentages. For example, the access rule generation system 600 may determine the triggering stability rating of an access rule based on the variation of the triggering percentages for the subsets.

The access rule generation system 600 may also determine predictive percentages for each of the plurality of time-based subsets of access requests. The access rule generation system 600 may determine a detection stability rating by comparing the plurality of predictive percentages. For example, the access rule generation system 600 may determine the detection stability rating of an access rule based on the variation of the predictive percentages for the subsets. The access rule generation system 600 may assign higher triggering and detection stability ratings to the access rules having less triggering variation and less detection variation compared to other potential access rules.

In some circumstances, the predictive percentage of an access rule may have a large variation due to its predictive percentage increasing over time. In this case, the access rule generation server may 600 may determine a higher detection stability rating for the access rule.

At 605, the access rule generation system 600 may select a set of candidate access rules 634 from the potential access rules 640 by comparing the performance and the stability ratings of the potential access rues 640. For instance, a more stable access rule may be selected over a higher performing access rule. The candidate access rules 634 may be provided to the operator of the resource and some or all of the candidate access rules 634 made be used as the access rules implemented by an access server.

In addition, the access rule generation system 600 may identify potential access rules having high performance but low stability. The access rule generation system 600 may add certain conditions to the access rule to account for the variability over time, thereby improving the access rules performance and stability. As such, the access rule generation system 600 may select candidate access rules that are both high performing and consistent in their performance.

III. Delay in Reporting Fraudulent Access Requests

There is typically a delay between the occurrence of fraudulent access and the reporting of the fraudulent access. a small percentage of fraudulent access requests are reported within the first week after the fraudulent access occurs. However, after 216 days, 100% of fraudulent access requests that will be reported have been reported. That is, the validity information is 100% accurate after 216 days.

The reporting-delay information may also be represented as shown in Table 1:

TABLE 1

Cumulative Distribution in the Reporting of Fraudulent Access Requests

| | Cumulative Percentages | | | | | | | | | | |
|---|---|---|---|---|---|---|---|---|---|---|---|
| | 10% | 20% | 30% | 40% | 50% | 60% | 70% | 80% | 90% | 95% | 100% |
| Reporting Delay (days) | 14 | 24 | 33 | 42 | 52 | 64 | 79 | 98 | 126 | 150 | 216 |

The delay may occur because authorized users of the resource may not immediately notice the effects of the unauthorized access. As such, the validity information for recent access requests may be inaccurate until a sufficient amount of time has passed for occurrences of fraudulent access to be reported. For this reason, prior access rule generation systems may not include more recent access requests in the training set. For example, prior access rule generation systems may not consider access requests received within the past three months or the past six months, for example, due to the delay in reporting. However, not including the most recent access requests in the training set means that the training set may not be representative of the most recent patterns of fraudulent activity. As such, access rules selected based older access requests may not accurately identify fraudulent access requests made according to new patterns of fraud and they may also generate more false positives.

To improve the performance of the access rules, the access rule generation system may track reports of fraudulent access over time to develop a reporting time distribution indicating the proportion of fraudulent access that has been reported after a certain amount of time. The access rule generation system may compensate the validity information corresponding to access requests that trigger a certain rule based on reports received for other access rules that also trigger the same rule. The validity information may be compensated according to the expected reporting delay such that more recent access requests are compensated more than older access requests. Accordingly, the most recently received access requests may be included in the training set, thereby making the candidate access rules more accurate with respect to new patterns of fraud.

A. Distribution of Reporting Over Time

Figure 7:
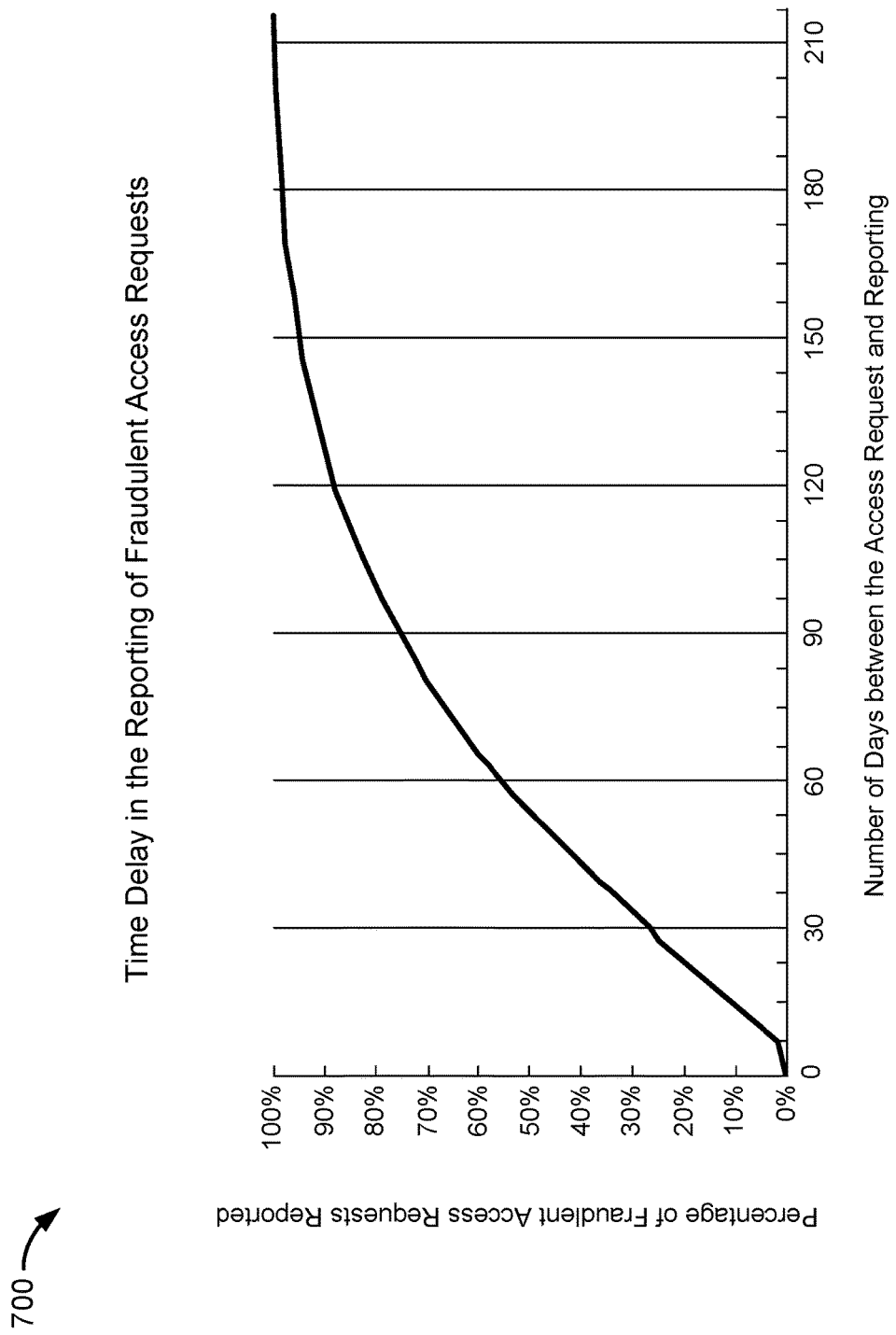
FIG. 7 shows an exemplary graph of the time delay in the reporting of fraudulent access requests, in accordance with some embodiments.

FIG. 7 shows an exemplary graph 700 of the time delay in the reporting of fraudulent access requests over time, in accordance with some embodiments. The graph 700 shows the percentage of fraudulent access requests (e.g., fraudulent access requests that were not rejected) that have been reported within a certain number of days since the occurrence of the access request. The x-axis indicates the number of days between the access request being made and the reporting of the access request being fraudulent (e.g., the reporting delay). The y-axis indicates the percentage of invalid access requests reported within the number of days indicated on the x-axis. In the example shown in FIG. 7, only The reporting-delay information may also be based a mathematical function or algorithm that determines a plurality of reporting percentages for a corresponding plurality of time periods. A table of reporting-delay information may be based on such a function or algorithm.

Access servers used for different purposes may have different reporting delays. In addition, different reporting channels may also have different reporting delays. For example, there may be a different distribution is the delay time between reports received from users and reports received from resource operators. Accordingly, the reporting information used by the access rule generation server may include several different reporting-delay distributions for different type of access requests or different reporting channels. The reporting-delay information may be obtained by tracking the time and date that access requests were made, the time and date that the access requests were reported as being invalid, and the channel that the report was received from.

Such reporting-delay distributions may be used to estimate or determine the total number of invalid access requests that will be reported based on the number of fraudulent access requests that have already been reported and the percentage of fraudulent access requests that are expected to have been reported after a certain delay. As further described below, an access rule generation computer may compensate recently received access requests based on the reporting distribution to account for the reporting delay.

Figure 8:
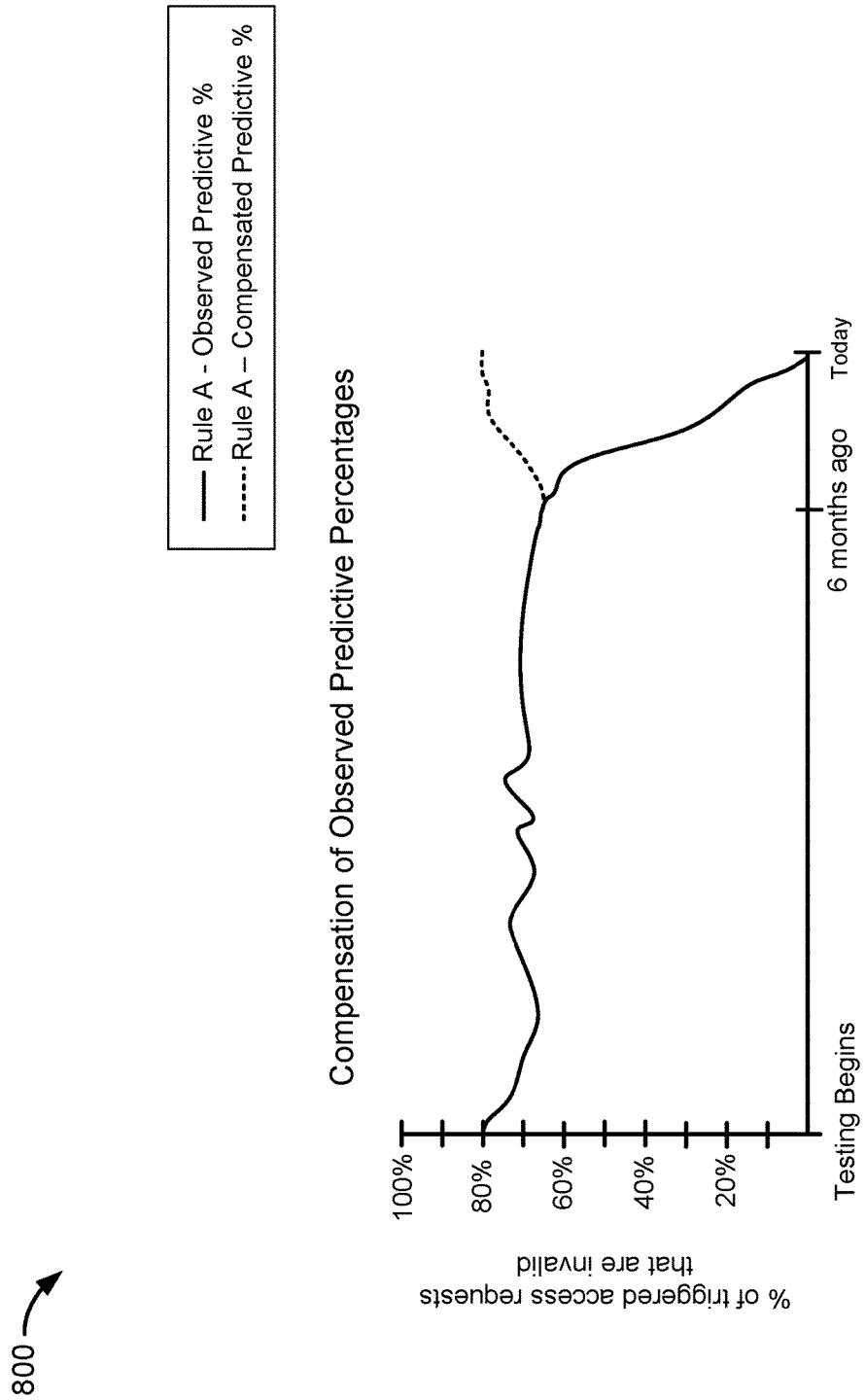
FIG. 8 shows a graph of observed predictive percentages and compensated predictive percentages for an access rule over time, in accordance with some embodiments.

B. Compensation of the Observed Fraud Detection Based on the Reporting Delay FIG. 8 shows a graph 800 of observed predictive percentages and compensated predictive percentages for an access rule over time, in accordance with some embodiments. The observed predictive percentage may be determined based on the percentage of triggering access requests that were reported to be fraudulent. However, as discussed above, there may be a delay in reporting fraudulent access to a resource. Accordingly, as shown in the graph 800, the observed predictive percentage for an access rule may be lower for more recent time periods (e.g., from six months ago to today). For example, as shown in the graph 800, the observed predictive percentage (indicated by the solid line) for a first access rule, Rule A, may decrease from over 60% prior to 6 months ago to less than 1% by today.

However, as described above, a rule generation computer may compensate the validity information based on reporting-delay information. Thus, the predictive percentages may be adjusted accordingly, as shown by the dashed line in FIG. 8. The rule generation computer may use the compensated validity information in determining the stability of the observed predictive percentage for an access rule. As further described below, the access rule generation system may determine a detection stability rating for an access rule based on the compensated predictive percentages.

Figure 9:
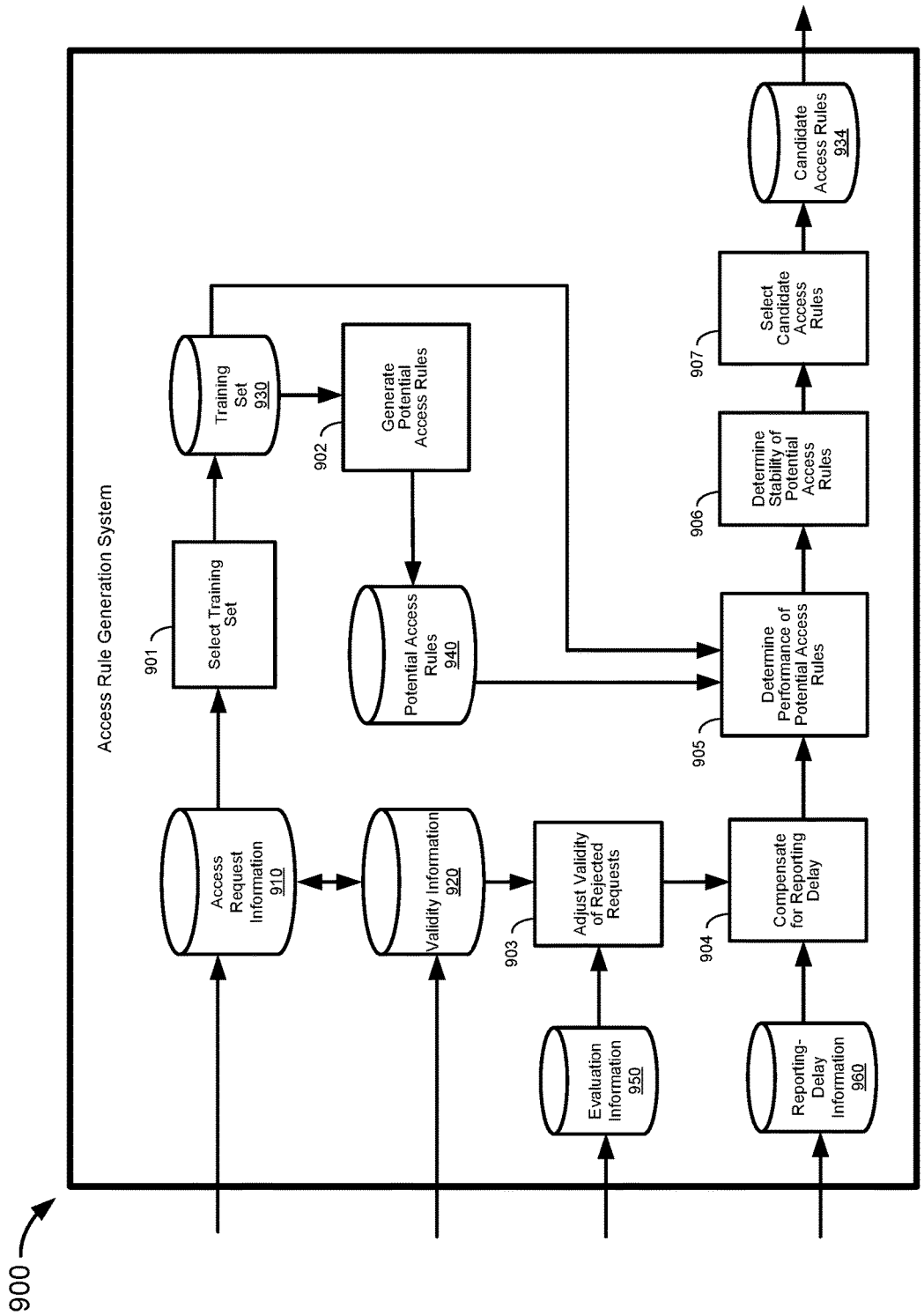
FIG. 9 shows a functional block diagram of an access rule generation system for generating and selecting access rules based on reporting-delay information, in accordance with some embodiments.

C. System for Generating and Selecting Access Rules Based on the Reporting Delay FIG. 9 shows a functional block diagram of an access rule generation system 900 for generating and selecting access rules based on reporting-delay information, in accordance with some embodiments. The reporting-delay information may be used to compensate validity information, thereby adjusting the predictive percentages and the detection stability of the access rules. Accordingly, the candidate access rules may be more accurate for recent patterns of fraud.

The access rule generation system 900 may operate similar to the access rule generation system 600 of FIG. 6. The access rule generation system 900 may be used in a resource access system similar to the resource access system 100 of FIG. 1 described above.

The access rule generation system 900 may store access request information 910 and corresponding validity information 920 for use in generating candidate access rules 934. The access rule generation system 900 may also store evaluation information 950 for determining the performance of access rules that are currently implemented by the access server. The evaluation information 950 may include identifiers of the access rules that are currently implemented by an access server. The evaluation information 950 may also include evaluation records including identifiers and parameters of the access requests that were allowed during evaluation of an access rule and identifiers of the evaluated access rules.

The access rule generation system 900 may also store reporting-delay information 960 for compensating the validity information. The reporting-delay information 960 may indicate compensation factors for adjusting the validity information corresponding to recently received access requests. The compensation factors may be based on the percentage of fraudulent access requests expected to be reported after a certain amount of time. In some embodiments, the reporting-delay information 960 may include a function for determining the compensation factor based on based on the number of days since the access request was accepted. In some embodiments, the reporting-delay information 960 may include a compensation table indicating compensation factors corresponding to the amount of time since the access request was accepted. The table may identify a cumulative percentage of reports expected to be received after a certain number of days similar to Table 1 above. For example, the reporting-delay information 960 may indicate that 10% of reports are expected to be received within 14 days. Accordingly, the compensation table may indicate a compensation factor of 10 (e.g., 1÷10%). The access request information 910, the validity information 920, the evaluation information, and the reporting-delay information may be received from a resource computer, a request computer, or an access server.

At 901, the access rule generation system 900 may select a subset of access requests from the stored access request information 910 to obtain a training set 930 of access requests for use in generating the candidate access rules 924. The access rule generation system 900 may select access requests to be included in the training set 930 based on the time and date when the access request was received. The access rule generation system 900 may also select the training set such that it includes both recent access requests (e.g., those occurring within the past eighteen months) and historical access requests (e.g., those occurring more than eighteen months ago).

At 902, the access rule generation system 900 may generate a plurality of potential access rules 940 based on the training set 930 of access requests. In some embodiments, the access rule generation system 900 may generate the potential access rules based on a decision tree. For instance, each node of the decision tree may represent a condition of an access rule parameter and branches of the decision tree may represent potential access rules 940.

Before determining the performance of the potential access rules, the access rule generation system 900 may adjust the validity information 920 based on the evaluation information 950 and the reporting-delay information 960. At 903, the access rule generation system 900 may adjust the validity information 920 to account for false positives in the access requests rejected by the access rules implemented by the access server. The validity information 920 may be adjusted to account for false positives (e.g., legitimate access requests being denied).

The access rule generation system 900 determine a false positive percentage for each of the access rules currently implemented by the access server based on the validity information 920 and the evaluation information 950. As described above with reference to FIG. 2, certain access requests may be accepted instead of being rejected in order to evaluate the performance of the access rules that would have rejected the access request. For example, the access server may have accepted (instead of rejected) 100 access requests triggered by an access rule (e.g., for evaluation of the access rule) and 60 of those access requests may have been reported as being fraudulent. In this example, the outcome of that access rule is a false positive 40% of the time (40 out of 100). In some embodiments, the access rule generation system 900 may receive such false positive information from the access server, the resource computer, or the request computer.

The access rule generation system 900 may use the false positive percentage for a currently implemented access rule to weight the validity information corresponding to the access requests that trigger that access rule. For example, a valid access request may be assigned a validity score of 0.0 and a fraudulent access request may be assigned a validity score of 1.0 in the validity information 920. The access rule generation system 900 may adjust the validity scores for the rejected access requests (e.g., the requests that were not allowed for evaluation of the access rule) to account for the false positive percentage. Accordingly, the validity score of the rejected access requests may be adjusted from 1.0 to 0.6 based on the false positive percentage of 40%. Accordingly, the validity information 920 for the rejected access requests may account for the evaluation information indicating that the access rule generates false positives 40% of the time.

The adjusted validity information 920 (e.g., validity score) may be used by the access rule generation system 900 in determining the performance of the potential access rules 940. Therefore, the access rule generation system 900 may determine a fraud predictive percentage for potential access rules having the same, or similar, conditions as the currently implemented access rules. Therefore, the access rule generation system 900 provides improved candidate rule selection since it may update or replace certain underperforming access rules that are currently being implemented by the access server. As such, the access rules generation system 900 overcomes the problems of prior rule generation systems which are not able to evaluate the performance of the currently implemented rules.

Having fewer false positives is advantageous to users and user device. Depending on the purpose and implementation of the access server, higher performing (e.g., less false positives) access rules selected by the access rule generation system 900 may lead to fewer users being denied access to their website accounts, fewer legitimate transactions for goods or services being denied, and fewer legitimate emails being labeled as "junk" email. In addition, user devices may consume fewer network resources since legitimate access requests will not need to be re-sent as often since the access rules produce fewer false positives.

The access rule generation computer may further adjust the validity information. At 904, the access rule generation system 900 may compensate the validity information 920 to account for the reporting delay based on the reporting-delay information 960. The reporting-delay information 960 may indicate compensation factors for compensating recently received access requests. The compensation factors may be based on the percentage of fraudulent access requests expected to be reported after a certain amount of time since the access request was accepted. In some embodiments, the reporting-delay information 960 may include a function or a table for determining the compensation factor based on based on the number of days since the access request was accepted.

In one example of compensating validity information, the reporting-delay information 960 may indicate that 30% of reports are expected to be received within 33 days and that 40% of reports are expected to be received within 42 days of the access request being made. Accordingly, the reporting-delay information 960 may indicate a compensation factor of 2.5 (e.g., 100%÷40%) for access requests received within the past 34 to 42 days. In this example, the access rule generation system 900 compensate the reported access requests that were received within the past 34 to 42 days based on the compensation factor of 2.5. Accordingly, if a fraudulent access request is assigned a validity score of 1.0, then the compensated validity score would be 2.5. The access rule generation system 900 may compensate each the access requests according to the reporting-delay information 960.

After generating the plurality of potential access rules 940, the access rule generation system 900 may determine, at 905, the performance of each of the potential access rule 940. The performance of a potential access rule may be based on the validity information 920 corresponding to the access requests of the training set 930 that satisfy the conditions of the potential access rule. As discussed above, the validity information 920 may be adjusted to account for false positives and it may be compensated to account for the reporting delay. The access rule generation system 900 may determine the performance of a potential access rule 940 based on its predictive percentage.

After determining the performance of the potential access rules 940, the access rule generation system 900 may determine, at 906, the triggering stability and the detection stability of the potential access rules 940. The access rule generation system 900 may segment the access requests of the training set 930 into different time periods (e.g., week by week, or month by month). In some embodiments, the segments may be based on a sliding window (e.g., a one week period calculated for each day). The access rule generation system 900 may determine the triggering variation of an access rule based on the variation of its triggering percentages for each of the segments. The access rule generation system 900 may also determine the detection variation of an access rule based on the variation of its predictive percentages for each of the segments. The access rule generation system 900 may assign higher stability ratings to the access rules having less triggering variation and less detection variation.

After determining the performance and the stability of the potential access rules 940, the access rule generation system 900 may select, at 907, a set of candidate access rules 934, from the potential access rules 940 by comparing the performance and the stability ratings of the potential access rues 940. For instance, a more stable access rule may be selected over a higher performing access rule. The candidate access rules 934 may be provided to the operator of the resource and some or all of the candidate access rules 934 made be used as the access rules implemented by an access server.

Accordingly, the candidate access rules 934 generated and selected by the access rule generation system 900 may have a higher predictive percentage and produce fewer false positives since the rule generation process adjusted the validation information based on the evaluation information and the reporting-delay information and because the candidate access rule selection considered the stability of the potential access rules over time.

Furthermore, after generating and selecting the candidate access rules 934, the access rule generation system 900 may periodically receive one or more of: updated access request information 910, updated validity information 920, updated evaluation information 950, and updated reporting information 960. In response to receiving updated information, the access rule generation system 900 may generate and select a new set of candidate access rules using updated information according to the process described above. The access rule generation system 900 may then provide a new or updated set of candidate access rules to the access server. As such, the access rules implemented by the access server may be responsive to the most recent patterns of fraud, thereby reducing fraudulent access and also reducing false positives.

IV. Exemplary Methods for Access Rule Generation

A. Exemplary Method for Generating and Selecting Stable Access Rules

Figure 10:
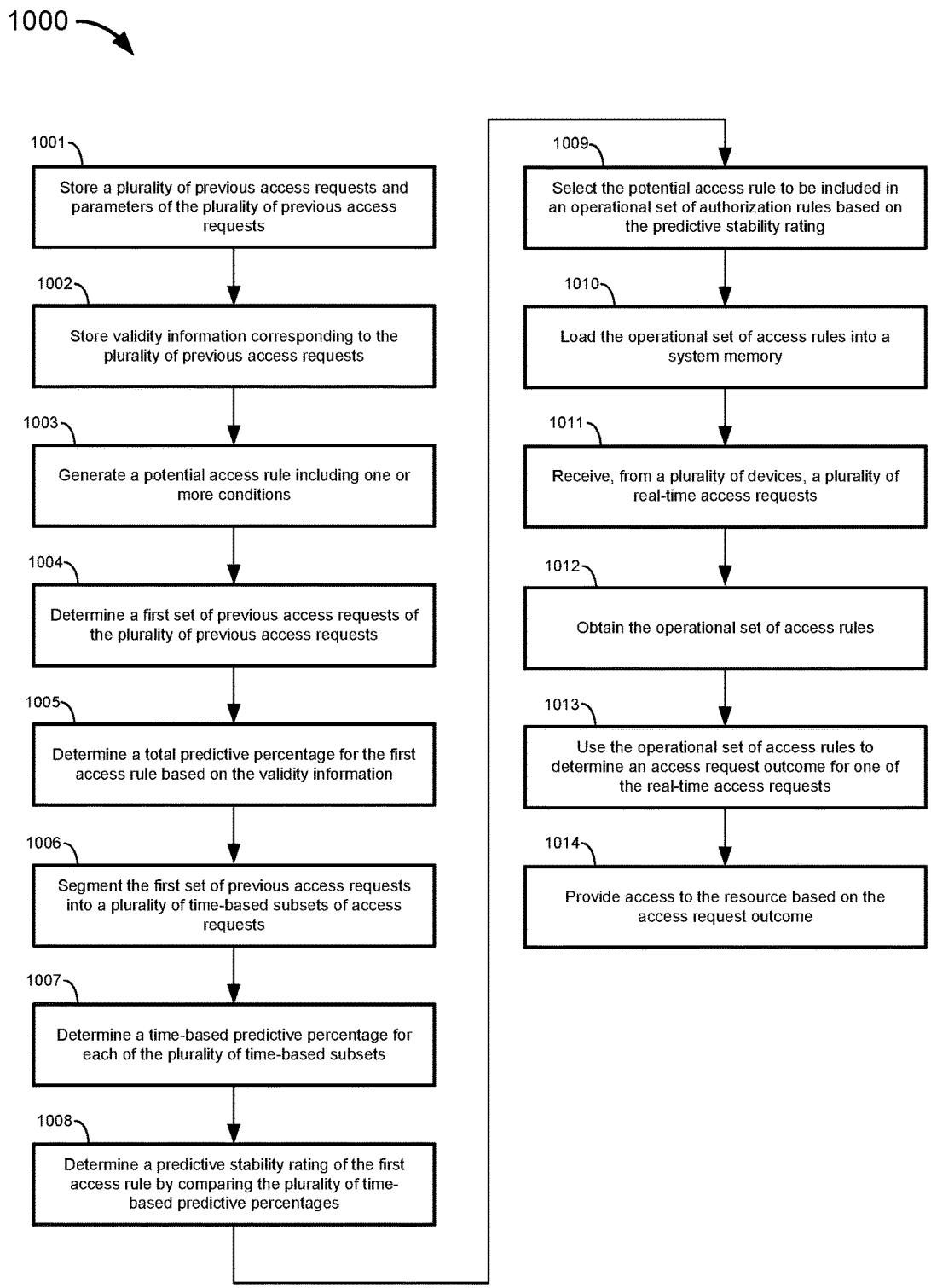
FIG. 10 shows a flowchart of a method for generating and selecting stable access rules, in accordance with some embodiments.

FIG. 10 shows a flowchart 1000 of a method for generating and selecting stable access rules, in accordance with some embodiments. The method may be performed by a computer system, such as the resource security system described herein. In some embodiments, some of the method steps may not be performed or the steps may be performed in a different order.

At step 1001, the computer system may store a plurality of previous access requests and parameters of the plurality of previous access requests. The plurality of previous access requests and parameters of the plurality of previous access requests may be used to generate candidate access rules. In some embodiments, the computer system may reduce the plurality of previous access requests to a training subset of access requests. For example, an access rule generation system may store access request information and select a training set of access request as discussed above.

At step 1002, the computer system may store validity information corresponding to the plurality of previous access requests. The validity information may indicate whether an access request is fraudulent, legitimate, or declined (e.g., rejected based on the access rules). The validation information may include validity scores corresponding to each access request of the plurality of previous access requests. The validity information may be based on reports of fraudulent access. For example, an access rule generation system may store validity information as discussed above.

At step 1003, the computer system may generate a potential access rule including one or more conditions. The potential access rules may be triggered by access requests involving the one or more conditions of the access rule. The potential access rule may provide an access rule outcome (e.g., accept, reject, or review) when it is triggered. In some embodiments, the computer system may generate the potential access rule based on a decision tree where each node of the decision tree represents a condition and the branches of the decision tree represent potential access rules. For example, an access rule generation system may potential access rules based on the training set of access requests as discussed above.

At step 1004, the computer system may determine a first set of previous access requests of the plurality of previous access requests. The first set of previous access requests may involve the one or more conditions of the potential access rule. That is, the first set of previous access requests may trigger the potential access rule. For example, prior to determining the performance of a potential access rule, an access rule generation system may determine which access requests of a training set of access requests trigger the potential access rule.

At step 1005, the computer system may determine a total predictive percentage for the first access rule based on the validity information. The total predictive percentage may be based on the percentage of access request triggering the potential access rule that are fraudulent based on the validity information. For example, an access rule generation system may determine the performance of a potential access rule based on the validity information corresponding to the access request of the training set that trigger that access rule.

At step 1006, the computer system may segment the first set of previous access requests into a plurality of time-based subsets of access requests. Each segment may correspond to a certain time-period (e.g., time window). In some embodiments, the access request may be segmented week-by-week or day-by-day. In other embodiments, the access requests may be segmented using a sliding window such that the triggering percentages are calculated each day over a one week window. For example, an access rule generation system may determine the triggering stability and the detection stability of an access rule by segmenting the access requests of a training set of access requests into a plurality of subsets based on the timing of when the access requests were received.

At step 1007, the computer system may determine a predictive percentage for each of the plurality of time-based subsets. The predictive percentages may be based on the validity information corresponding to each of the access requests in the subsets. For example, an access rule generation system may determine the triggering percentage and the predictive percentage of an access rule during certain periods of time (e.g., time windows) based on the access request information and the validity information.

At step 1008, the computer system may determine a detection stability rating of the first access rule by comparing the plurality of predictive percentages. The detection stability rating of the first access rule may be based on a computed variation of the predictive percentages such the detection stability rating increases as the variation decreases. For example, an access rule generation system may determine a detection stability rating based by computing the variation of the detection stability across each of the subsets, which correspond to different time periods.

At step 1009, the computer system may select the potential access rule to be included in an operational set of access rules based on the detection stability rating. The selection of the potential access rule to be included in the operational set may also be based on the total predictive percentage of the access rule. The selection may also be based on a comparison of the detection stability rating compared to stability ratings of other potential access rules. For example, an access rule generation system may select a set of candidate access rules from set of the potential access rules as discussed above.

At step 1010, the computer system may load the operational set of access rules into a system memory. The system memory may comprise RAM, ROM, EEPROM, or flash memory, for example. The system memory may contain code, for implementing the methods described herein. The system memory may be load data from a computer-readable storage medium, such as a hard disk drive or a solid state drive. The system memory may also load data from network-accessible storage media, such as from a database server. For example, an access server may load the access rules received from the access rule generation system into a system memory of the access server.

At step 1011, the computer system may receive, from a plurality of devices, a plurality of real-time access requests. For example, the access server may receive a plurality of real-time access requests from a user device or an access device, via a resource computer, as discussed above. The access requests may include parameters for each of the access requests.

At step 1012, when one of the access requests are received, the computer system may obtain the operational set of access rules from the system memory. For example, when an access server receives an access request from a resource computer, the access server may obtain the access rules from the system memory.

At step 1013, the computer system may use the operational set of access rules to determine an access request outcome for one of the real-time access requests. The access request outcome may be based on a plurality of access request outcomes provided by the operational set of access rules based on the parameters of the access request. The access request outcome may indicate to accept, reject, or review the access request. For example, an access server may determine an access request outcome based on the access rules as described above.

At step 1014, the computer system may provide access to the resource based on the access request outcome. For example, the computer system may provide access to the resource if the access request outcome indicates to accept the access request. The computer system may not provide access to the resource if the access request outcome indicated to reject the access request. For example, as discussed above, an access server may send an indication to a resource computer for the access request to be accepted and then the resource computer may provide access to the resource.

Figure 11:
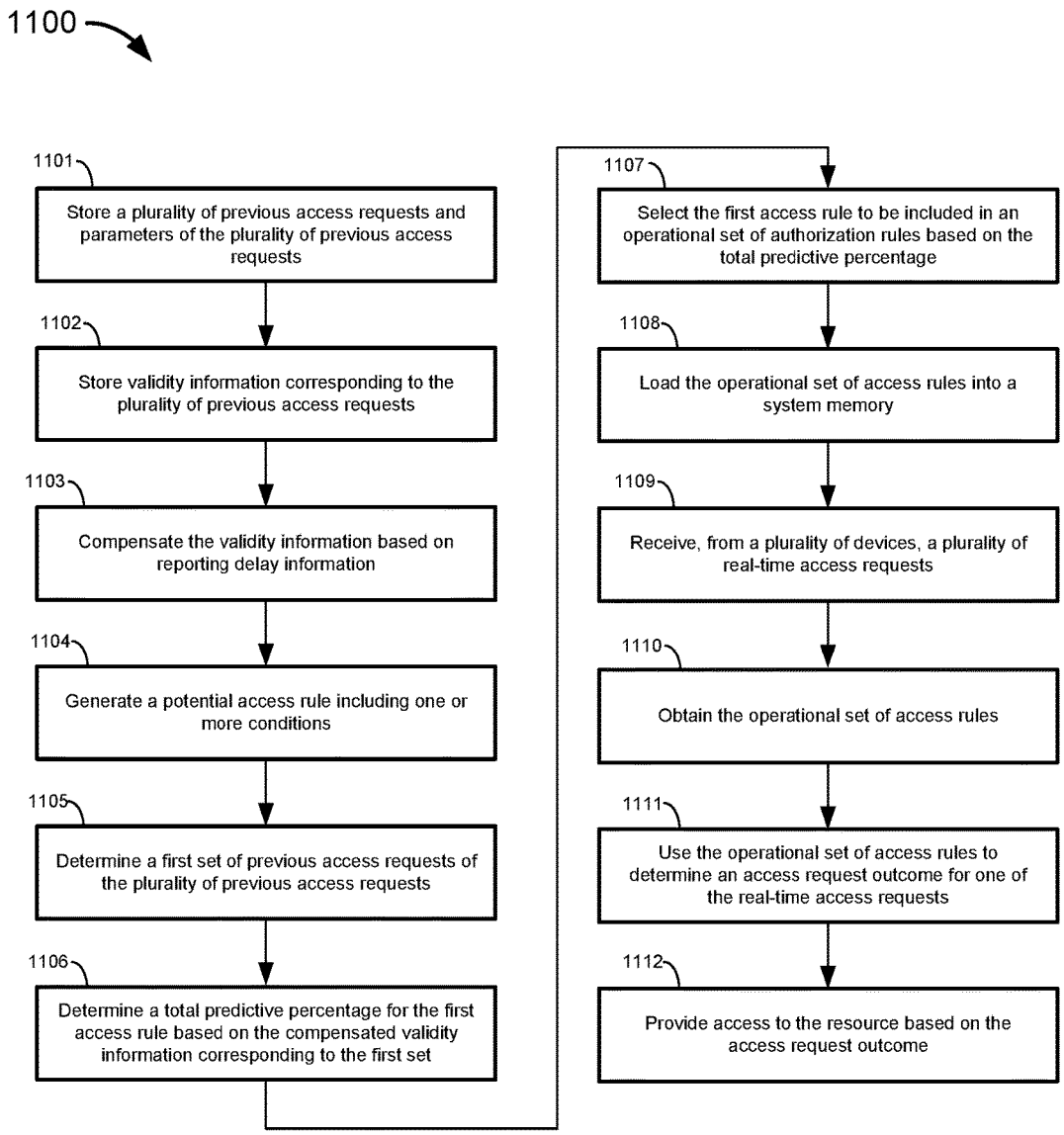
FIG. 11 shows a flowchart of a method for generating and selecting access rules based on compensated validity information, in accordance with some embodiments.

B. Exemplary Method for Generating and Selecting Access Rules Based on Compensated Validity Information FIG. 11 shows a flowchart 1100 of a method for generating and selecting access rules based on compensated validity information, in accordance with some embodiments. The method may be performed by a computer system, such as the resource security system described herein. In some embodiments, some of the method steps may not be performed or the steps may be performed in a different order.

At step 1101, the computer system may store a plurality of previous access requests and parameters of the plurality of previous access requests. The plurality of previous access requests and parameters of the plurality of previous access requests may be used to generate candidate access rules. In some embodiments, the computer system may reduce the plurality of previous access requests to a training subset of access requests. For example, an access rule generation system may store access request information and select a training set of access request as discussed above.

At step 1102, the computer system may store validity information corresponding to the plurality of previous access requests. The validity information may indicate whether an access request is fraudulent or legitimate. The validation information may include validity scores corresponding to each access request of the plurality of previous access requests. The validity information may be based on reports of fraudulent access. For example, an access rule generation system may store validity information as discussed above.

At step 1103, the computer system may compensate the validity information based on reporting-delay information. The computer system may compensate the validity information based on a reporting-delay distribution indicating an expected amount of time between the time when the access request was made and the time when fraudulent access was reported. For example, a validity score for an access request may be compensated based on compensation factors determined using the reporting-delay information. For example, an access rule generation system may compensate validity information using compensation factors that are based on reporting-delay information.

At step 1104, the computer system may generate a potential access rule including one or more conditions. The potential access rules may be triggered by access requests involving the one or more conditions of the access rule. The access rule may provide an access rule outcome (e.g., accept, reject, or review) when it is triggered. In some embodiments, the computer system may generate the potential access rules based on a decision tree where each node of the decision tree represents a condition of an access rule parameter and the branches of the decision tree represent the potential access rules. For example, an access rule generation system may potential access rules based on the training set of access requests as discussed above.

At step 1105, the computer system may determine a first set of previous access requests of the plurality of previous access requests. The first set of previous access requests may involve the one or more conditions of the potential access rule. That is, the first set of previous access requests may trigger the potential access rule. For example, prior to determining the performance of a potential access rule, an access rule generation system may determine which access requests of a training set of access requests trigger the potential access rule.

At step 1106, the computer system may determine a total predictive percentage for the first access rule based on the compensated validity information corresponding to the first set. The total predictive percentage may be based on the percentage of access request triggering the potential access rule that are fraudulent based on the validity information. For example, an access rule generation system may determine the performance of a potential access rule based on the validity information corresponding to the access request of the training set that trigger that access rule.

At step 1107, the computer system may select the first access rule to be included in an operational set of access rules based on the total predictive percentage. The selection of the potential access rule to be included in the operational set may also be based on the total predictive percentage of the access rule. The selection may also be based on a comparison of the detection stability rating compared to stability ratings of other potential access rules. For example, an access rule generation system may select a set of candidate access rules from set of the potential access rules as discussed above.

At step 1108, the computer system may load the operational set of access rules into a system memory. The system memory may comprise RAM, ROM, EEPROM, or flash memory, for example. The system memory may contain code, for implementing the methods described herein. The system memory may be load data from a computer-readable storage medium, such as a hard disk drive or a solid state drive. The system memory may also load data from network-accessible storage media, such as from a database server. For example, an access server may load the access rules received from the access rule generation system into a system memory of the access server.

At step 1109, the computer system may receive, from a plurality of devices, a plurality of real-time access requests. For example, the access server may receive a plurality of real-time access requests from a user device or an access device, via a resource computer, as discussed above. The access requests may include parameters for each of the access requests.

At step 1110, when one of the access requests are received, the computer system may obtain the operational set of access rules from the system memory. For example, when an access server receives an access request from a resource computer, the access server may obtain the access rules from the system memory.

At step 1111, the computer system may use the operational set of access rules to determine an access request outcome for one of the real-time access requests. The access request outcome may be based on a plurality of access request outcomes provided by the operational set of access rules based on the parameters of the access request. The access request outcome may indicate to accept, reject, or review the access request. For example, an access server may determine an access request outcome based on the access rules as described above.

At step 1112, the computer system may provide access to the resource based on the access request outcome. For example, the computer system may provide access to the resource if the access request outcome indicates to accept the access request. The computer system may not provide access to the resource if the access request outcome indicated to reject the access request. For example, as discussed above, an access server may send an indication to a resource computer for the access request to be accepted and then the resource computer may provide access to the resource.

V. Exemplary Computer Systems for Access Rule Generation and Implementation

The embodiments described above may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Figure 12:
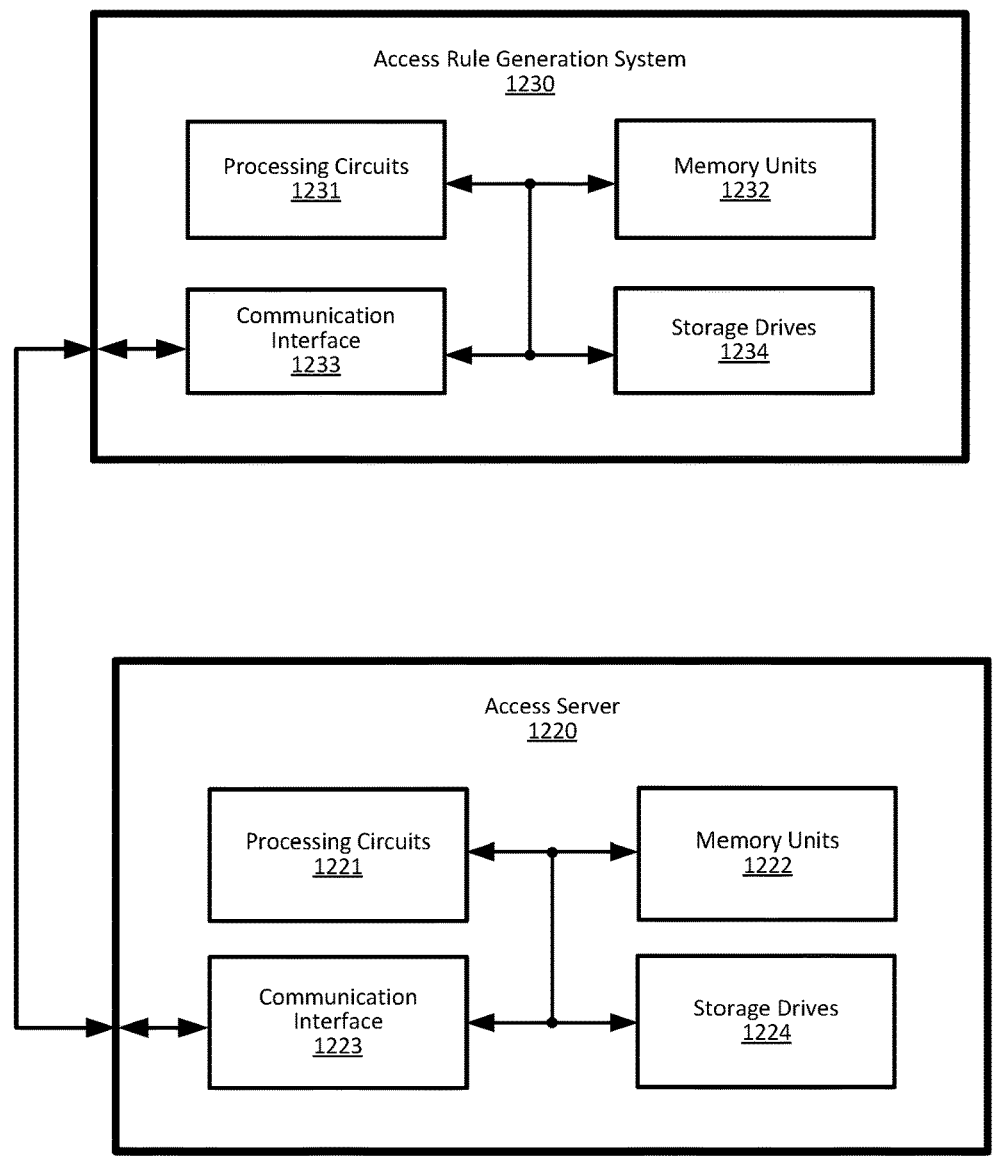
FIG. 12 shows a functional block diagram of components of an exemplary computer system including an access rule generation system and an access server, in accordance with some embodiments.

FIG. 12 shows a functional block diagram 1200 of components of an exemplary computer system including an access rule generation system 1230 and an access server 1220, in accordance with some embodiments. The various components may be embodied by computer hardware or computer code stored on a non-transitory computer readable storage medium.

The access rule generation system 1230 may comprise one or more processor circuits 1231. The processor circuits 1231 may execute instructions to perform the functions of the access rule generation systems described herein (e.g., generating and selecting access rules). The processor circuits 1231 may be coupled to one or more memory units 1232 that are configured to store data and instructions. The memory units 1232 may be non-transitory computer-readable storage medium. The processor circuits 1231 may read data from the memory units 1232 and write data to the memory units 1232. For example, the processor circuits 1231 may load into the memory units 1232 a plurality of access request information, validity information, reporting-delay information, evaluation information, training set data, information related access rule performance, and information related to access rule generation, and information related to access rule selection as described herein.

The access rule generation system 1230 may also comprise a communication interface 1233. The communication interface 1233 may receive communications from a communication interface of another computer, such as communications from a resource computer or an access server. The communication interface 1233 may also transmit communications to another computer. As described herein, the access rule generation system 1230 may receive access request information, reporting information, evaluation information, and reporting information from a resource computer or an access server.

The access rule generation system 1230 may also comprise one or more storage drives 1234. The storage drives 1234 may be directly coupled to the access rule generation system 1230 or they may be network access storage drives 1234. The storage drives 1234 may comprise one or more databases for storing the access request information, the reporting information, the evaluation information, and the reporting information described herein. The storage drives 1234 may store data that may be loaded into the memory units 1232 by the processor circuits 1231.

The access server 1220 may comprise one or more processor circuits 1221. The processor circuits 1221 may execute instructions to perform the functions of the access servers described herein (e.g., operating access rules to accept, reject, or review access requests). The processor circuits 1221 may be coupled to one or more memory units 1222 that are configured to store data and instructions. The memory units 1222 may be non-transitory computer-readable storage medium. The processor circuits 1221 may read data from the memory units 1222 and write data to the memory units 1222. For example, the processor circuits 1221 may load into the memory units 1222 a plurality of access request rules and parameters of an access request in order to determine an access request outcome, as described herein.

The access server 1220 may also comprise a communication interface 1223. The communication interface 1223 may receive communications from a communication interface of another computer, such as communications from a resource computer or an access server. The communication interface 1223 of the access server 1220 may communicate with the communication interface 1223 of the access rule generation system 1230. The communication interface 1223 may also transmit communications to another computer. The access server 1220 may receive access request information and access request parameters via the communication interface 1223.

The access server 1220 may also comprise one or more storage drives 1224. The storage drives 1224 may be directly coupled to the access server 1220 or they may be network accessible storage drives 1224. The storage drives 1224 may comprise one or more databases for storing the access request information and the access request parameters. The storage drives 1224 may store data that may be loaded into the memory units 1232 by the processor circuits 1221.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method for securing access to a resource, the method comprising performing, by a computer system:
   segmenting a set of previous access requests into a plurality of time-based subsets of access requests, each previous access request of the set including one or more parameters that involve one or more conditions of a potential access rule;
   determining a plurality of predictive percentages including a predictive percentage for each of the plurality of time-based subsets based on validity information corresponding to each previous access request of the time-based subsets, the validity information indicating whether each access request of the plurality of previous access requests is valid or invalid;
   determining a detection stability rating of the potential access rule by comparing the plurality of predictive percentages; and
   selecting the potential access rule to be a candidate access rule for use in an operational set of access rules based on the detection stability rating of the potential access rule compared to detection stability ratings of other access rules, wherein the candidate access rule is included in the operational set of access rules, the operational set of access rules is loaded into a system memory, and the operational set of access rules is used to determine an access request outcome for a real-time access request for the resource.

2. The method of claim 1, further comprising:
   storing reporting-delay information indicating percentages of access requests that are expected to have been reported as valid or invalid after certain amounts of time; and
   compensating the validity information based on the reporting-delay information, wherein the plurality of predictive percentages are based on the compensated validity information.

3. The method of claim 2, wherein the reporting-delay information indicates a plurality of time periods and a corresponding plurality of reporting percentages, the corresponding plurality of reporting percentages indicating the percentages of access requests that are expected to have been reported within the plurality of time periods.

4. The method of claim 3, wherein the validity information corresponding to a recent access request is compensated more than the validity information corresponding to a later access request.

5. The method of claim 1, further comprising determining a detection variation of the plurality of predictive percentages, wherein the determining of the detection stability rating of the potential access rule is further based on a trend of the detection variation over time.

6. The method of claim 1, wherein the segmenting of the set of previous access requests into a plurality of subsets of access requests is based on a plurality of sliding time windows.

7. The method of claim 1, further comprising:
   determining a triggering percentage for each of the plurality of time-based subsets based on the validity information corresponding to each previous access request of the time-based subsets;
   determining a triggering stability rating of the potential access rule by comparing the plurality of triggering percentages, wherein the selecting of the potential access rule to be included in the operational set of access rules is further based on the triggering stability rating of the potential access rule; and
   determining a triggering variation of the plurality of triggering percentages, wherein the determining of the detection stability rating of the potential access rule is further based on the triggering variation.

8. The method of claim 1, further comprising adjusting the validity information based on false positive percentages of the operational set of access rules.

9. The method of claim 1, wherein the set of previous access requests includes at least one previous access requests that was received within a past week and at least one previous access request that was received more than eighteen months ago.

10. The method of claim 1, further comprising:
including the candidate access rule in the operational set of access rules based on the detection stability rating of the candidate access rule compared to detection stability ratings of other access rules;
loading the operational set of access rules into a system memory;
receiving, over a network from a plurality of devices, a plurality of real-time access requests;
accessing the system memory to obtain the operational set of access rules when one of the plurality of real-time access requests is received from a first device of the plurality of devices;
using the operational set of access rules to determine an access request outcome for the one real-time access request; and
providing access to the resource based on the access request outcome.

11. A computer system for securing access to a resource, the computer system comprising:
a computer readable storage medium storing a plurality of instructions; and
one or more processors for executing the instructions stored on the computer readable storage medium to:
segment a set of previous access requests into a plurality of time-based subsets of access requests, each previous access request of the set including one or more parameters that involve one or more conditions of a potential access rule;
determine a plurality of predictive percentages including a predictive percentage for each of the plurality of time-based subsets based on validity information corresponding to each previous access request of the time-based subsets, the validity information indicating whether each access request of the plurality of previous access requests is valid or invalid;
determine a detection stability rating of the potential access rule by comparing the plurality of predictive percentages; and
select the potential access rule to be a candidate access rule for use in an operational set of access rules based on the detection stability rating of the potential access rule compared to detection stability ratings of other access rules, wherein the candidate access rule is included in the operational set of access rules, the operational set of access rules is loaded into a system memory, and the operational set of access rules is used to determine an access request outcome for a real-time access request for the resource.

12. The computer system of claim 11, further comprising instructions to:
store reporting-delay information indicating percentages of access requests that are expected to have been reported as valid or invalid after certain amounts of time; and
compensate the validity information based on the reporting-delay information, wherein the plurality of predictive percentages are based on the compensated validity information.

13. The computer system of claim 12, wherein the reporting-delay information indicates a plurality of time periods and a corresponding plurality of reporting percentages, the reporting percentages indicating the percentages of access requests that are expected to have been reported within the corresponding time periods.

14. The computer system of claim 13, wherein the validity information corresponding to a recent access request is compensated more than the validity information corresponding to a later access request.

15. The computer system of claim 11, further comprising instructions to determine a detection variation of the plurality of predictive percentages, wherein the determining of the detection stability rating of the potential access rule is further based on a trend of the detection variation over time.

16. The computer system of claim 11, wherein the segmenting of the set of previous access requests into a plurality of time-based subsets of access requests is based on a plurality of sliding time windows.

17. The computer system of claim 11, further comprising instructions to:
determine a triggering percentage for each of the plurality of time-based subsets based on the validity information corresponding to each previous access request of the time-based subsets;
determine a triggering stability rating of the potential access rule by comparing the plurality of triggering percentages, wherein the selection of the potential access rule to be included in the operational set of access rules is further based on the triggering stability rating of the potential access rule; and
determine a triggering variation of the plurality of triggering percentages, wherein the determining of the detection stability rating of the potential access rule is further based on the triggering variation.

18. The computer system of claim 11, further comprising instructions to adjust the validity information based on false positive percentages of the operational set of access rules.

19. The computer system of claim 11, wherein the set of previous access requests includes at least one previous access requests that was received within a past week and at least one previous access request that was received more than eighteen months ago.

20. The computer system of claim 11, further comprising instructions to:
include the candidate access rule in the operational set of access rules based on the detection stability rating of the candidate access rule compared to detection stability ratings of other access rules;
load the operational set of access rules into a system memory;
receive, over a network from a plurality of devices, a plurality of real-time access requests;
access the system memory to obtain the operational set of access rules when one of the plurality of real-time access requests is received from a first device of the plurality of devices;
use the operational set of access rules to determine an access request outcome for the one real-time access request; and
provide access to a resource based on the access request outcome.

* * * * *